US011724756B2

(12) United States Patent
Aubin-Marchand et al.

(10) Patent No.: US 11,724,756 B2
(45) Date of Patent: Aug. 15, 2023

(54) TRACK SYSTEM FOR A VEHICLE HAVING AT LEAST THREE AXLES, VEHICLE COMPRISING THE SAME AND PIVOTING ASSEMBLIES ADAPTED FOR CONNECTION BETWEEN A FRAME OF A TRACK SYSTEM AND AN AXLE OF A VEHICLE

(71) Applicant: SOUCY INTERNATIONAL INC., Drummondville (CA)

(72) Inventors: Jeremie Aubin-Marchand, St-Hugues (CA); Simon Bouchard, Saint-Germain-de-Grantham (CA); Samuel Lasnier Guillemette, Richmond (CA); Yan Roger, Drummondville (CA); Stephane Genois Pelletier, St-Samuel (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 317 days.

(21) Appl. No.: 17/096,338

(22) Filed: Nov. 12, 2020

(65) Prior Publication Data

US 2021/0139091 A1    May 13, 2021

Related U.S. Application Data

(60) Provisional application No. 62/934,311, filed on Nov. 12, 2019.

(51) Int. Cl.
    *B62D 55/10*     (2006.01)
    *B62D 55/12*     (2006.01)
    *B62D 55/104*    (2006.01)

(52) U.S. Cl.
    CPC ........... *B62D 55/10* (2013.01); *B62D 55/104* (2013.01); *B62D 55/12* (2013.01)

(58) Field of Classification Search
    CPC ...... B62D 55/10; B62D 55/104; B62D 55/12; B62D 55/14; B62D 55/02; B62D 55/00;
    (Continued)

(56) References Cited

U.S. PATENT DOCUMENTS

| 1,178,552 A | * | 4/1916 | Strait | B62D 55/116 |
| | | | | 305/130 |
| 1,404,520 A | * | 1/1922 | Gregory | B62D 55/02 |
| | | | | 180/9.54 |

(Continued)

FOREIGN PATENT DOCUMENTS

| WO | WO 8502825 A1 * | 7/1985 | ............. B62D 55/14 |
| WO | WO-2014022044 A1 * | 2/2014 | ............. B62D 55/14 |
| WO | WO-2018172953 A1 * | 9/2018 | ........... B62D 55/065 |

*Primary Examiner* — Minnah L Seoh
*Assistant Examiner* — Abigail R Hymel
(74) *Attorney, Agent, or Firm* — BCF LLP

(57) ABSTRACT

A track system for a vehicle having at least three axles is disclosed. The track system includes a frame to which sprocket, idler and support wheel assemblies are connectable, an endless track and a pivoting assembly. The pivoting assembly has a casing connectable to a second axle and at least one pivotable member that has first and second portions respectively pivotally connected to the casing and to the frame. The at least one pivotable member is pivotable between first and second positions about a longitudinally extending pivot, in response to which the first portion is displaced laterally relative to the second portion, and pivotable between third and fourth positions about a lateral pivot axis in response to which the first portion is displaced longitudinally relative to the second portion. A pivoting assembly, a pivoting assembly including a resilient assembly, and a vehicle having the track system are also disclosed.

19 Claims, 17 Drawing Sheets

(58) Field of Classification Search
CPC .. B62D 55/08; B62D 55/084; B62D 55/0842; B62D 55/108; B62D 55/116
See application file for complete search history.

(56) References Cited

U.S. PATENT DOCUMENTS

| | | | | |
|---|---|---|---|---|
| 1,725,817 | A * | 8/1929 | Holger | B62D 55/10 |
| | | | | 305/132 |
| 1,802,656 | A * | 4/1931 | Kegresse | B62D 55/02 |
| | | | | 180/9.58 |
| 2,041,599 | A * | 5/1936 | Fergusson | B62D 55/108 |
| | | | | 180/6.7 |
| 2,092,607 | A * | 9/1937 | Johnston | B62D 49/0621 |
| | | | | 180/6.7 |
| 2,105,042 | A * | 1/1938 | Kegresse | B62D 55/02 |
| | | | | 305/141 |
| 2,107,072 | A * | 2/1938 | Herrington | B62D 55/02 |
| | | | | 74/342 |
| 2,487,134 | A * | 11/1949 | Herold | B62D 55/108 |
| | | | | 305/133 |
| 8,851,581 | B2 * | 10/2014 | Marchildon | B62D 55/04 |
| | | | | 305/132 |
| 2007/0181351 | A1 * | 8/2007 | Brazier | B62D 55/04 |
| | | | | 180/9.54 |
| 2008/0196947 | A1 * | 8/2008 | Brazier | B60G 21/045 |
| | | | | 180/9.5 |
| 2017/0057571 | A1 * | 3/2017 | Einola | B62D 55/12 |

* cited by examiner

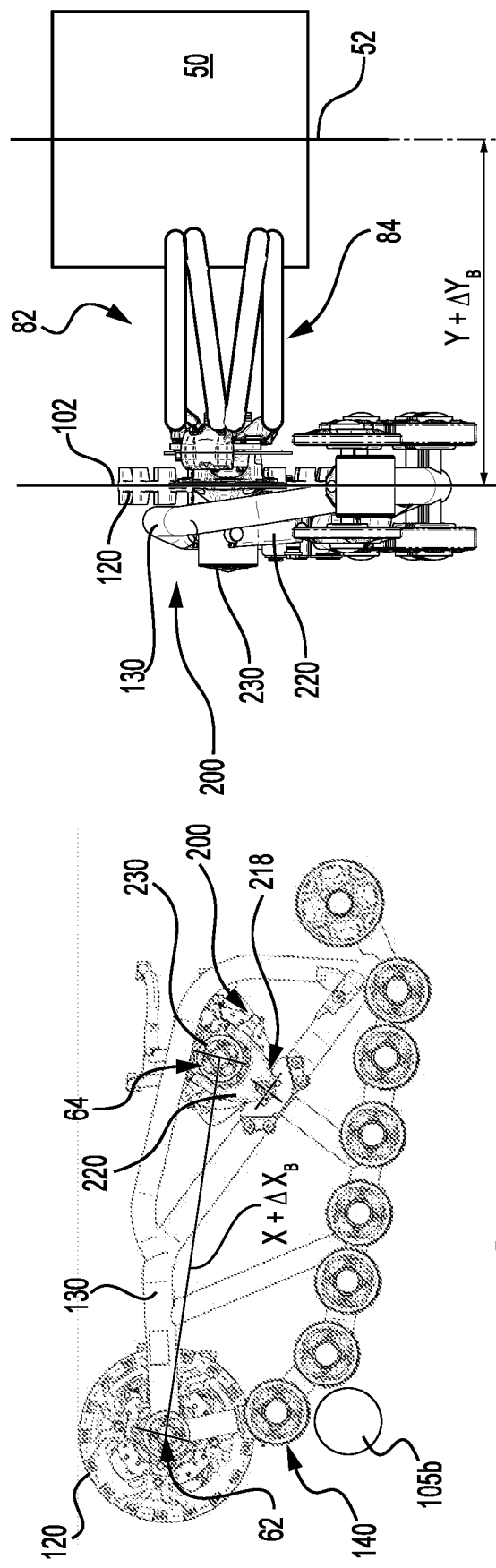

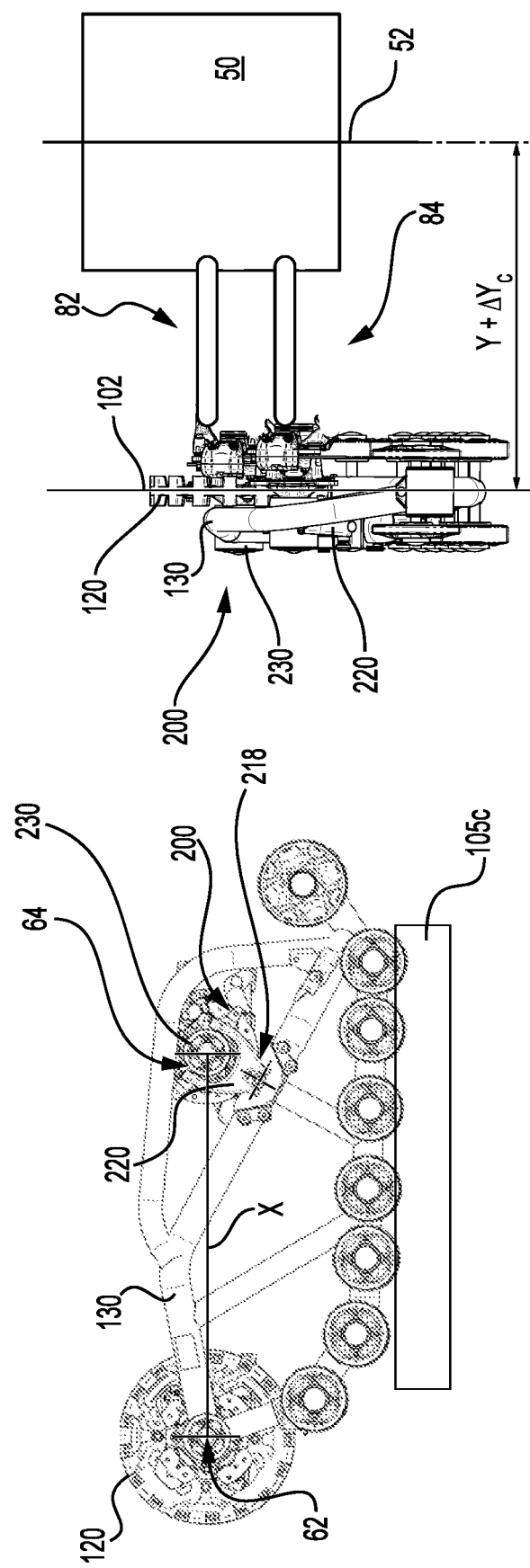

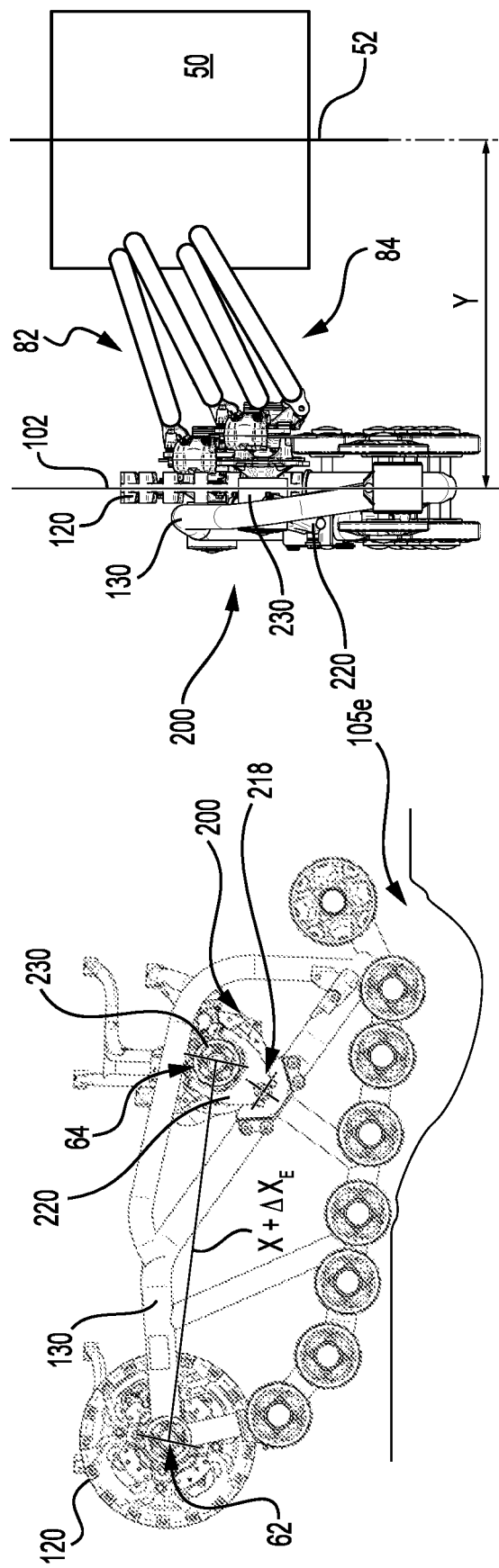

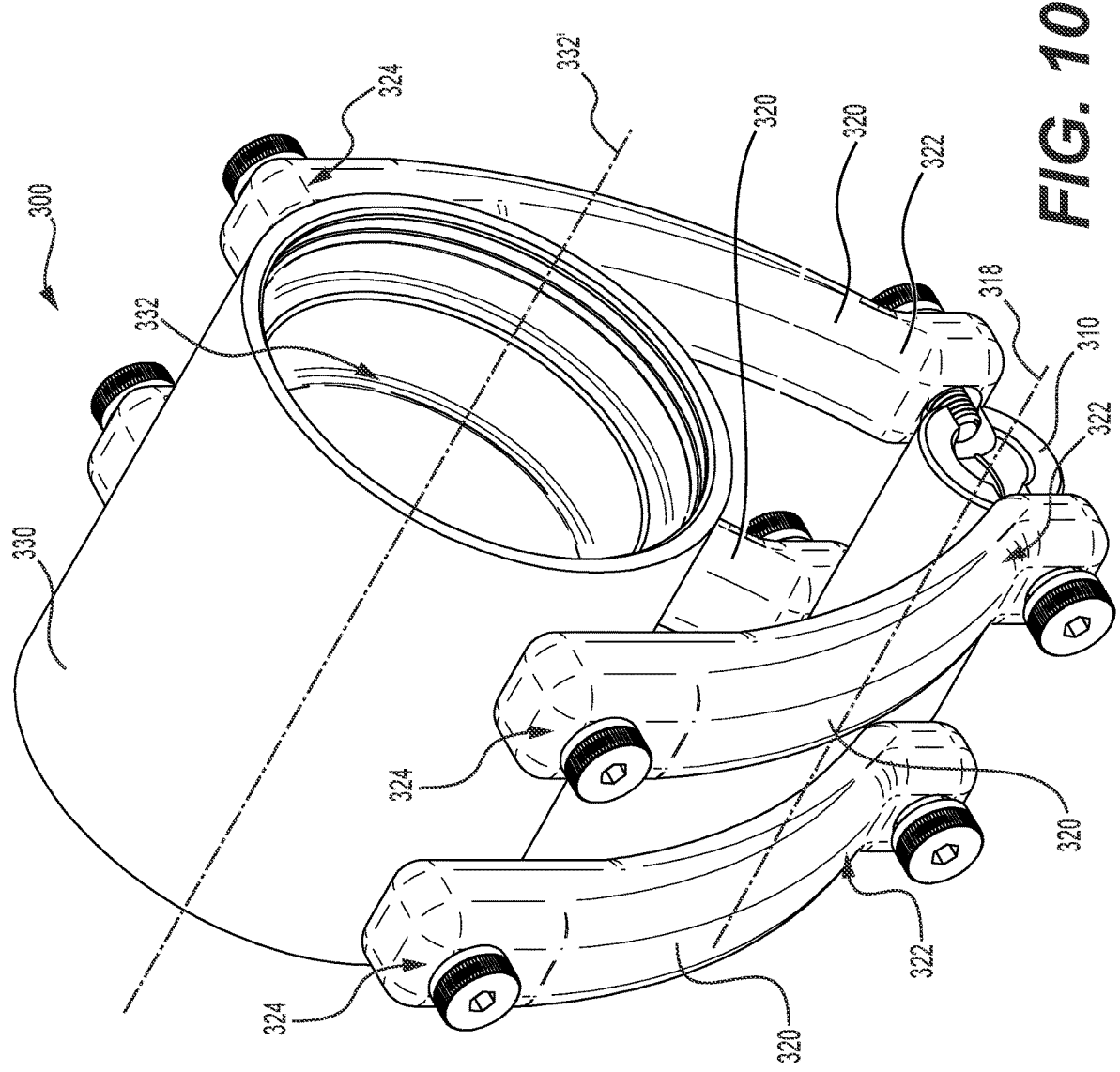

TRACK SYSTEM FOR A VEHICLE HAVING AT LEAST THREE AXLES, VEHICLE COMPRISING THE SAME AND PIVOTING ASSEMBLIES ADAPTED FOR CONNECTION BETWEEN A FRAME OF A TRACK SYSTEM AND AN AXLE OF A VEHICLE

CROSS-REFERENCE TO RELATED APPLICATION

The present application claims priority to U.S. Provisional Patent Application Ser. No. 62/934,311, filed Nov. 12, 2019, entitled "Rear Track Kit For 6×6 Vehicle", which is incorporated by reference herein in its entirety.

TECHNOLOGICAL FIELD

The present technology relates to a track system for a vehicle having at least three axles, to vehicles comprising the same and pivoting assemblies adapted for connection between a frame of a track system and an axle of a vehicle.

BACKGROUND

Certain vehicles, such as, for example, agricultural vehicles (e.g., harvesters, combines, tractors, etc.), construction vehicles (e.g., trucks, front-end loaders, etc.) and recreational vehicles (e.g., all-terrain vehicles, utility-terrain vehicles, side-by-side vehicles, etc.) are used on ground surfaces that are soft, slippery and/or uneven (e.g., soil, mud, sand, ice, snow, etc.).

Conventionally, such vehicles have had large wheels with tires on them to move the vehicle along the ground surface. Under certain conditions, such tires may have poor traction on some types of ground surfaces or may present other inconveniences.

In order to reduce at least some of the aforementioned drawbacks, track systems were developed to be used in place of at least some of the wheels and tires on the vehicles. In some instances where vehicles were designed with the intention of using wheels, track kits were developed for replacing the wheels of such vehicles. Given that these track systems are retrofitted on vehicles that were initially designed to support wheels, the configuration of these vehicles is typically not adapted to readily receive track systems. This is particularly true for vehicles having more than two axles such as six-wheeled off-road vehicles, such as utility-terrain vehicle (UTVs) or side-by-side off-road vehicles (SSVs).

Generally described, typical retrofitted track systems can reduce the efficiency of the vehicle's suspension systems. This can limit propulsion characteristics of the vehicle in some conditions, such as on rough terrain, as the contact between the tracks and the terrain can be inadequate. In some cases, off-road vehicles have independent suspension systems on each wheel, which can complicate the conversion of a wheel assembly to a track system due to the lateral displacement of the suspension systems elements (in some cases), amongst other things.

Therefore, there is a desire for a track system that could mitigate at least some of the above-mentioned drawbacks.

SUMMARY

It is an object of the present technology to ameliorate at least some of the inconveniences present in the prior art.

Generally described, the track system of the present technology is connected to the off-road vehicle at a first axle and at a second axle. The track system has a frame, an idler wheel assembly and a plurality of support wheel assemblies. The sprocket wheel assembly is operatively connectable to the first axle to drive the endless track of the track system. The second axle of the vehicle is operatively connected to a casing that is pivotally connected to the frame via at least one pivotable member. The pivotable member is pivotable about a longitudinally extending axis and a laterally extending axis. The pivotal motions of the pivotal member allows the second axle to move relative to the first axle independently while distributing more evenly the load born by the first and second axles to the track system. Other features and advantages of the present technology will be described in the following description.

According to one aspect of the present technology, there is provided a track system for a vehicle having at least three axles. The track system includes a frame, a sprocket wheel assembly, an idler wheel assembly, a plurality of support wheel assemblies, a pivoting assembly and an endless track. The sprocket wheel assembly is operatively connectable to a first axle of the at least three axles, and rotationally connectable to the frame. The idler wheel assembly is rotationally connectable to the frame. The plurality of support wheel assemblies are rotationally connectable to the frame. The pivoting assembly has a casing and at least one pivotable member. The casing is operatively connectable to a second axle of the at least three axles. The at least one pivotable member has a first portion being pivotally connected to the casing, and a second portion being pivotally connected to the frame. The at least one pivotable member is pivotable between a first position and a second position about a longitudinally extending pivot axis causing the first portion to be displaced laterally relative to the second portion in response to the at least one pivotable member pivoting between the first position and the second position. The at least one pivotable member is further pivotable between a third position and a fourth position about a laterally extending pivot axis causing the first portion to be displaced longitudinally relative to the second portion in response to the at least one pivotable member pivoting between the third position and the fourth position. The endless track is wrapped around the sprocket wheel assembly, the idler wheel assembly and the plurality of support wheel assemblies.

In some embodiments, the track system further includes a first hub mount and a second hub mount. The first hub mount is operatively connectable to the first axle of the at least three axles and to the driving sprocket assembly, and the second hub mount is operatively connectable to the second axle of the at least three axles, the second hub mount being rotationally connectable to the casing.

In some embodiments, the first portion of the at least one pivotable member is displaceable laterally outwardly relative to the second portion in response to the at least one pivotable member pivoting from the first position to the second position.

In some embodiments, the first portion of the at least one pivotable member is displaceable laterally inwardly relative to the second portion in response to the at least one pivotable member pivoting from the second position to the first position.

In some embodiments, a longitudinal center plane of the track system remains parallel with a longitudinal center plane of the vehicle in response to the pivotable member pivoting from the first position to the second position.

In some embodiments, in response to the first axle moving vertically, the track system moves laterally.

In some embodiments, the at least one pivotable member includes two pivotable members.

In some embodiments, the at least one pivotable member includes four pivotable members.

In some embodiments, two of the four pivotable members are connected in a first pair, and an other two of the four pivotable members are connected in a second pair.

In some embodiments, the casing defines a laterally extending casing axis, the casing axis remaining parallel to the laterally extending pivot axis in response to the at least one pivotable member pivoting from the first position to the second position.

In some embodiments, the casing defines a laterally extending casing axis, the casing axis remaining parallel to the laterally extending pivot axis in response to the at least one pivotable member pivoting from the third position to the fourth position.

In some embodiments, the casing axis extends above the laterally extending pivot axis.

In some embodiments, the casing axis extends below the laterally extending pivot axis.

In some embodiments, the second portion of the at least one pivotable member is connected to the frame by a resilient assembly, the resilient assembly being deformable such that the at least one pivotable member is pivotable relative to the frame.

According to another aspect of the present technology, there is provided a vehicle having at least three axles and at least three suspension assemblies. A first axle of the at least three axles is operatively connected to a first suspension assembly of the at least three suspension assemblies, and a second axle of the at least three axles is operatively connected to a second suspension assembly of the at least three suspension assemblies, and at least one track system according to at least one of the above aspects or according to at least one of the above aspects and one or more of the above embodiments.

In some embodiments, the first suspension assembly is operatively connected to the first axle independently of the second suspension assembly, and the second suspension assembly is operatively connected to the second axle independently of the first suspension assembly.

In some embodiments, the vehicle is one of a side-by-side off-road vehicle, and a utility-terrain vehicle.

In some embodiments, the first axle is an intermediate axle, and the second axle is a rear axle of the vehicle.

In another aspect of the present technology, there is provided a pivoting assembly adapted for connection between a frame of a track system and an axle of a vehicle. The pivoting assembly includes a casing and at least one pivotable member. The casing is operatively connectable to the axle of the vehicle. The at least one pivotable member has a first portion that is pivotally connected to the casing, and a second portion that is pivotally connected to the frame of the track system. The at least one pivotable member is pivotable between a first position and a second position about a longitudinally extending pivot axis causing the first portion to be displaced laterally relative to the second portion in response to the at least one pivotable member pivoting between the first position and the second position. The at least one pivotable member is further pivotable between a third position and a fourth position about a laterally extending pivot axis causing the first portion to be displaced longitudinally relative to the second portion in response to the at least one pivotable member pivoting between the third position and the fourth position.

In some embodiments, the first portion of the at least one pivotable member is displaceable laterally outwardly relative to the second portion in response to the at least one pivotable member pivoting from the first position to the second position.

In some embodiments, the first portion of the at least one pivotable member is displaceable laterally inwardly relative to the second portion in response to the at least one pivotable member pivoting from the second position to the first position.

In some embodiments, the at least one pivotable member includes two pivotable members.

In some embodiments, the at least one pivotable member includes four pivotable members.

In some embodiments, two of the four pivotable members are connected in a first pair, and an other two of the four pivotable members are connected in a second pair.

In some embodiments, the casing defines a laterally extending casing axis, the casing axis remaining parallel to the laterally extending pivot axis in response to the at least one pivotable member pivoting from the first position to the second position.

In some embodiments, the casing defines a laterally extending casing axis, the casing axis remaining parallel to the laterally extending pivot axis in response to the at least one pivotable member pivoting from the third position to the fourth position.

In some embodiments, the casing axis extends above the laterally extending pivot axis.

In some embodiments, the casing axis extends below the laterally extending pivot axis.

In another aspect of the present technology, there is provided a pivoting assembly adapted for connection between a frame of a track system and an axle of a vehicle. The pivoting assembly includes a casing, at least one pivotable member and a resilient assembly. The casing is operatively connectable to the axle of the vehicle. The at least one pivotable member has a first portion and a second portion, the first portion being connectable to the casing. The resilient assembly is connectable to the second portion of the at least one pivotable member, and the second portion of the at least one pivotable member is connectable to the frame through the resilient assembly. The at least one pivotable member is pivotable between a first position and a second position about a longitudinally extending pivot axis causing the first portion of the at least one pivotable member to be displaced laterally relative to the second portion of the at least one pivotable member in response to the resilient assembly resiliently deforming between the first position and the second position. The at least one pivotable member is further pivotable between a third position and a fourth position about a laterally extending pivot axis causing the first portion of the at least one pivotable member to be displaced longitudinally relative to the second portion of the at least one pivotable member in response to the resilient assembly resiliently deforming between the third position and the fourth position.

In some embodiments, the first portion of the at least one pivotable member is displaceable laterally outwardly relative to the second portion in response to the at least one pivotable member pivoting from the first position to the second position.

In some embodiments, the first portion of the at least one pivotable member is displaceable laterally inwardly relative to the second portion in response to the at least one pivotable member pivoting from the second position to the first position.

In some embodiments, the at least one pivotable member includes two pivotable members.

In some embodiments, the at least one pivotable member includes four pivotable members.

In some embodiments, two of the four pivotable members are connected in a first pair, and an other two of the four pivotable members are connected in a second pair.

In some embodiments, the casing defines a laterally extending casing axis, the casing axis remaining parallel to the laterally extending pivot axis in response to the at least one pivotable member pivoting from the first position to the second position.

In some embodiments, the casing defines a laterally extending casing axis, the casing axis remaining parallel to the laterally extending pivot axis in response to the at least one pivotable member pivoting from the third position to the fourth position.

In some embodiments, the casing axis extends above the laterally extending pivot axis.

In some embodiments, the casing axis extends below the laterally extending pivot axis.

For purposes of the present application, terms related to spatial orientation when referring to a vehicle and components in relation to the vehicle, such as "vertical", "longitudinal", "lateral", "horizontal", "forwardly", "rearwardly", "left", "right", "above" and "below", are as they would be understood by a driver of the vehicle sitting thereon in an upright driving position, with the vehicle steered straight-ahead and being at rest on flat, level ground.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 8B is a left side elevation view of the track system of FIG. 8A encountering an obstacle causing a sprocket wheel assembly to be in an elevated position and with the pivoting assembly of FIG. 7A being in the initial position;

FIG. 8C is a left side elevation view of the track system of FIG. 8A encountering an obstacle causing the sprocket wheel assembly and the pivoting assembly of FIG. 7A to be in elevated positions;

FIG. 8E is a left side elevation view of the track system of FIG. 8A encountering an obstacle causing the sprocket wheel assembly to be in the initial position, and the pivoting assembly to be in a lower position;

FIG. 9B is a rear view of the track system of FIG. 8B connected to a schematic view of the UTV of FIG. 5;

FIG. 9C is a rear view of the track system of FIG. 8C connected to a schematic view of the UTV of FIG. 5;

FIG. 9E is a rear view of the track system of FIG. 8E connected to a schematic view of the UTV of FIG. 5;

FIG. 10 is a perspective view taken from a top, front, left side of a second embodiment of a pivoting assembly, the pivoting assembly being in an initial position;

DETAILED DESCRIPTION

Different embodiments of present technology will now be described with reference to the accompanying drawings, which are provided herein for illustrative purposes only and are not intended to be limiting. Although the present technology is described in terms of specific illustrative embodiments, it is to be understood that the embodiments described herein are by way of example only and that the scope of the technology is not intended to be limited thereby. As a person skilled in the art would understand, various embodiments of the present technology may be of a greater complexity than what is described herein.

Figure 1:
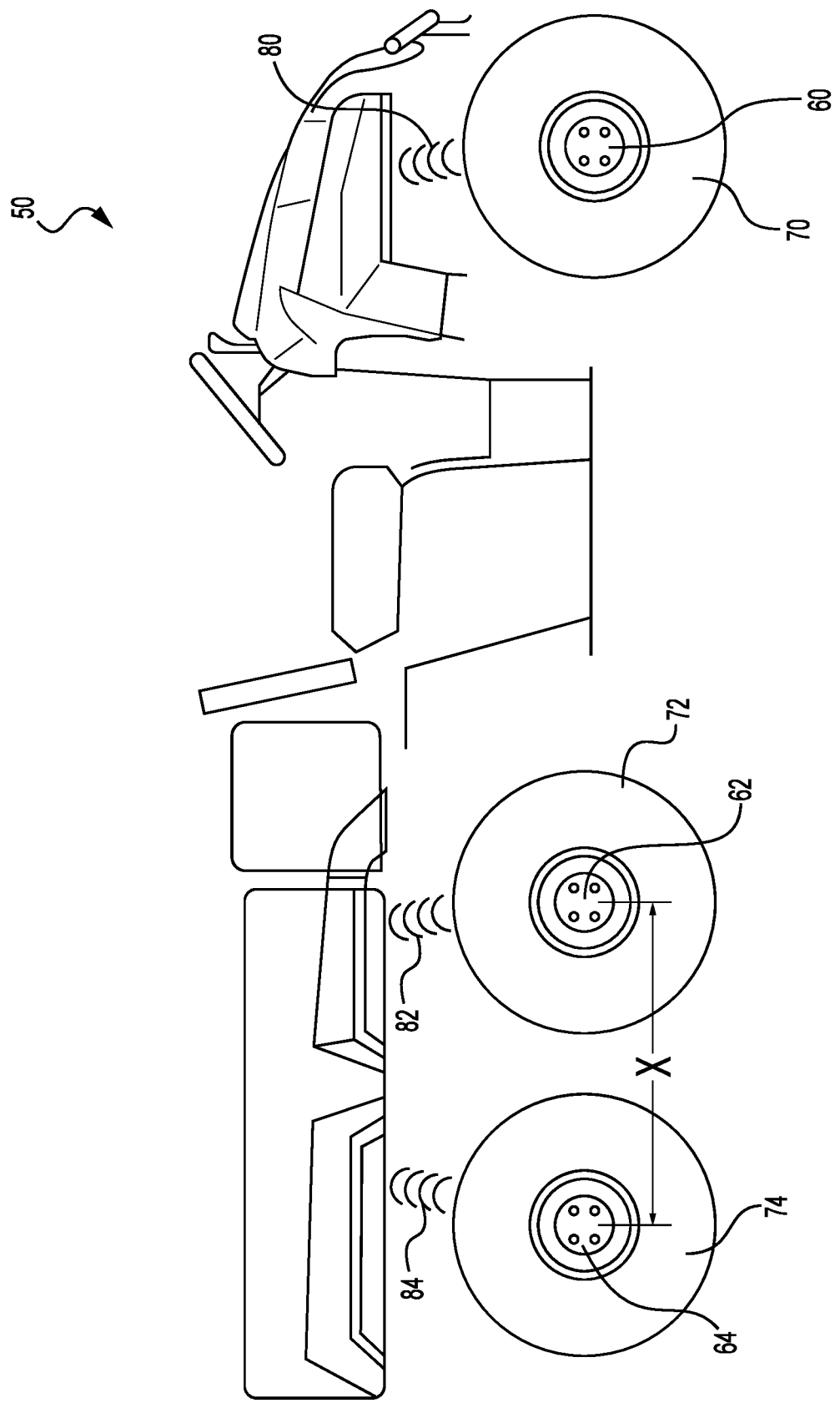
FIG. 1 is a schematic, right side elevation view of an UTV as part of the prior art, the UTV having a front axle, an intermediate axle, and a rear axle with wheels connected thereto.

Referring to FIG. 1, a vehicle 50 as known in the art will be described. The vehicle 50 is an off-road utility terrain vehicle (UTV). It is contemplated that in some embodiments, the vehicle 50 could be an agricultural vehicle or a recreational vehicle, such an all-terrain vehicle (ATV) or a side-by-side vehicle (SSV). The vehicle 50 has three axles that extend laterally from a longitudinal center plane 52 (FIG. 4) of the vehicle 50: a front axle 60, an intermediate axle 62 and a rear axle 64 that, at an initial position, is spaced from the intermediate axle 62 by a distance X. The front axle 60 is operatively connected to front wheels 70 (only the front right wheel is shown). The intermediate axle 62 is operatively connected to intermediate wheels 72 (only the intermediate right wheel is shown). The rear axle 64 is operatively connected to rear wheels 74 (only the rear right wheel is shown). It is contemplated that in other embodiments, the vehicle 50 could have more than three axles, and thus could have more than six wheels. In the present embodiment, the wheels 60, 62, 64 drive the vehicle 50. The intermediate and rear wheels 62, 64 are not steerable and drive the vehicle 50.

Figure 3:
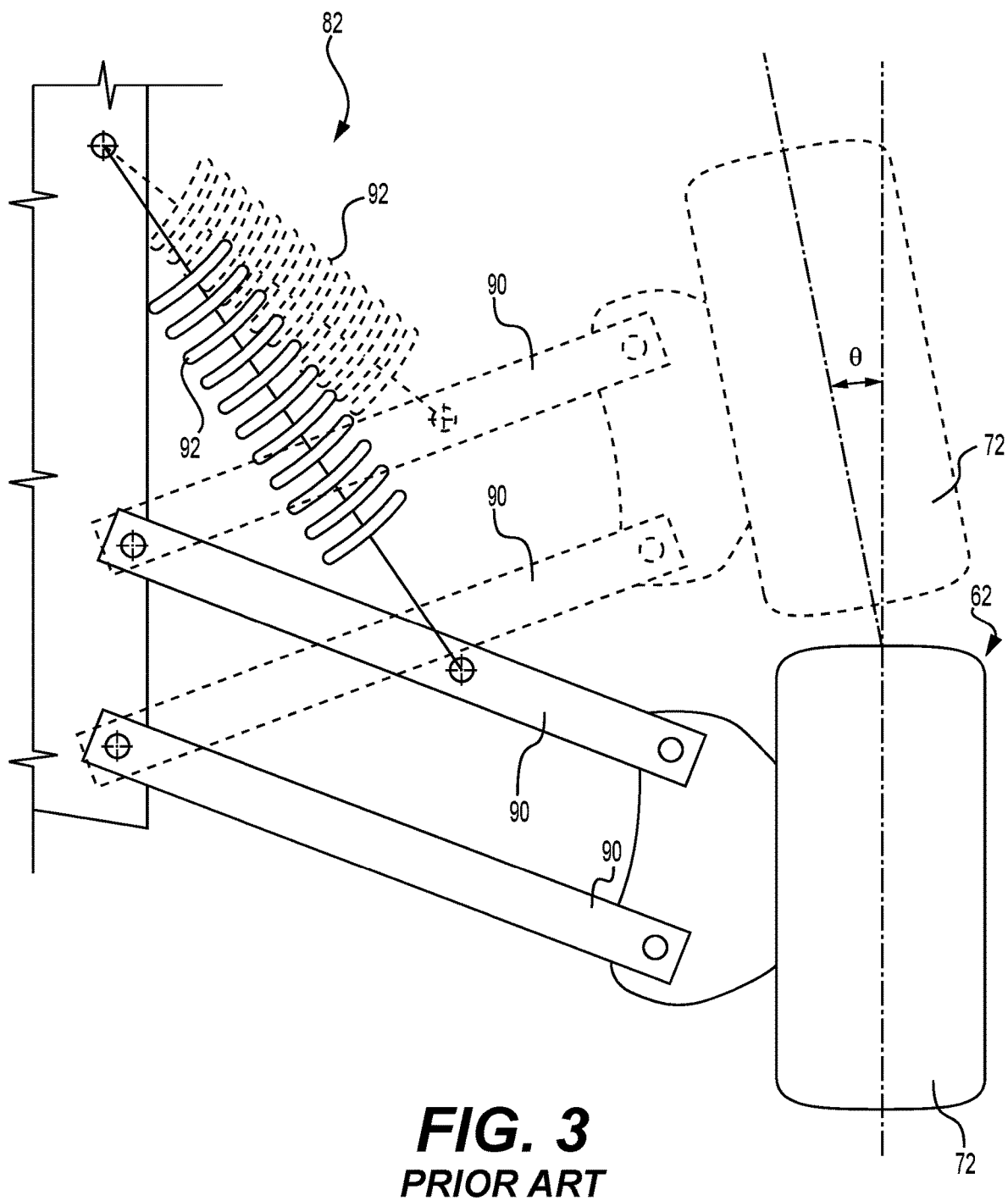
FIG. 3 is a rear view of components of the rear right suspension system of the UTV of FIG. 1 in a compressed state (dotted lines) and in a rest state (solid line), the rear right suspension system including double a-arms.

The vehicle 50 has a front suspension system 80 that is connected to the vehicle 50 and to the front axle 60, an intermediate suspension system 82 that is connected to the vehicle 50 and to the intermediate axle 62, and a rear suspension system 84 that is connected to the vehicle 50 and to the rear axle 64. In the present embodiment, the suspension systems 80, 82, 84 are independent of one another. At the rear of the vehicle 50, each of the suspension systems 82, 84 (only the suspension system 82 is shown in FIG. 3) include two a-arm 90 and a shock absorber assembly 92. The suspension system 82 shown in FIG. 3 includes two a-arms 90 pivotally connected to the frame of the vehicle 50.

Figure 2:
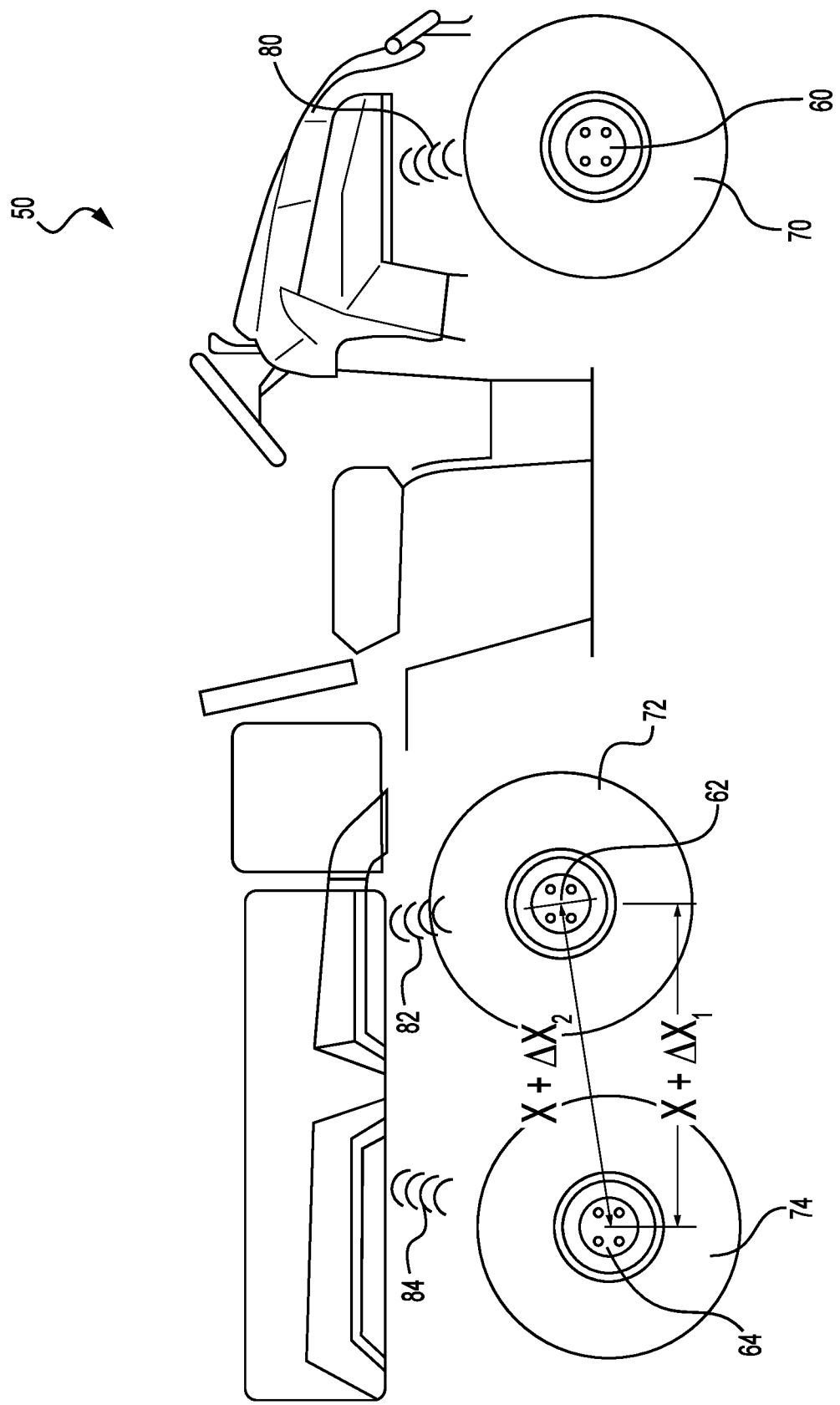
FIG. 2 is a schematic, right side elevation view of the UTV of FIG. 1 as the intermediate axle of the UTV is overcoming an obstacle.

Referring to FIGS. 2 and 3, the suspension system 82 will be described as the vehicle 50 travels over uneven terrain and encounters an obstacle such that the intermediate right wheel 72 moves upwardly. This description of the suspension system 82 aims at providing the skilled reader with knowledge of the drawbacks of existing suspension systems when the vehicle 50 is to be equipped with track systems in replacement of its wheels.

Since the suspension systems 82 and 84 are independent and allow some independent longitudinal displacement of the wheels 72, 74, movement of the intermediate axle 62 relative of the rear axle 64 causes in certain circumstances the longitudinal distance between the intermediate axle 62 and the rear axle 64, which was initially X (FIG. 1) to change by an increment $\Delta X_1$. Thus, as seen in FIG. 2, when the suspension system 82 is compressed and the suspension system 84 is not, the longitudinal distance between the intermediate axle 62 and the rear axle 64 becomes $X+\Delta X_1$. Furthermore, the true distance between the center of the intermediate axle 62 and the center of the rear axle 64, which was also initially X, changes by an increment $\Delta X_2$. Thus, as seen in FIG. 2, when the suspension system 82 is compressed and the suspension system 84 is not, the true distance between the intermediate axle 62 and the rear axle 64 becomes $X+\Delta X_2$. However, should a typical track system be connected to the vehicle 50 in replacement of the wheels 72, 74, the changes of longitudinal and true distances between the axles 62, 64 may cause the endless track of the track system to have to little or too much tension therein during operation, which can cause premature wear and tear of the endless track over time and reduced traction in certain circumstances. Moreover, should a frame of the track system rigidly connect the intermediate and rear axles 62, 64 together, the performance of the suspension systems 82, 84 will be affected as they will no longer be independent.

As best seen in FIG. 3, the a-arms 90 pivot upwardly with respect to the vehicle 50 when the intermediate right wheel 72 encounters an obstacle such as bump, and the shock absorber 92 is compressed, as shown by the dotted lines of FIG. 3. When the a-arms 90 pivot upwardly, the camber angle of the intermediate right wheel 72 changes (best shown in FIG. 3) as the intermediate right wheel has a tendency to camber inward when the suspension system 82 compresses. This change of the camber angle is represented by angle $\theta$ in FIG. 3. As the wheel 72 has a tire that is capable of deforming, the change of camber angle does not affect significantly the traction of the wheel 72 or its wear. However, should a typical track system be connected to the vehicle 50 in replacement of the wheel 72, the change of camber angle caused by the suspension system 82 can affect significantly the traction of the endless track in certain circumstances and cause premature wear and tear to the endless track over time, especially to the inner portion of the outer, ground-engaging surface of the endless track.

Figure 4:
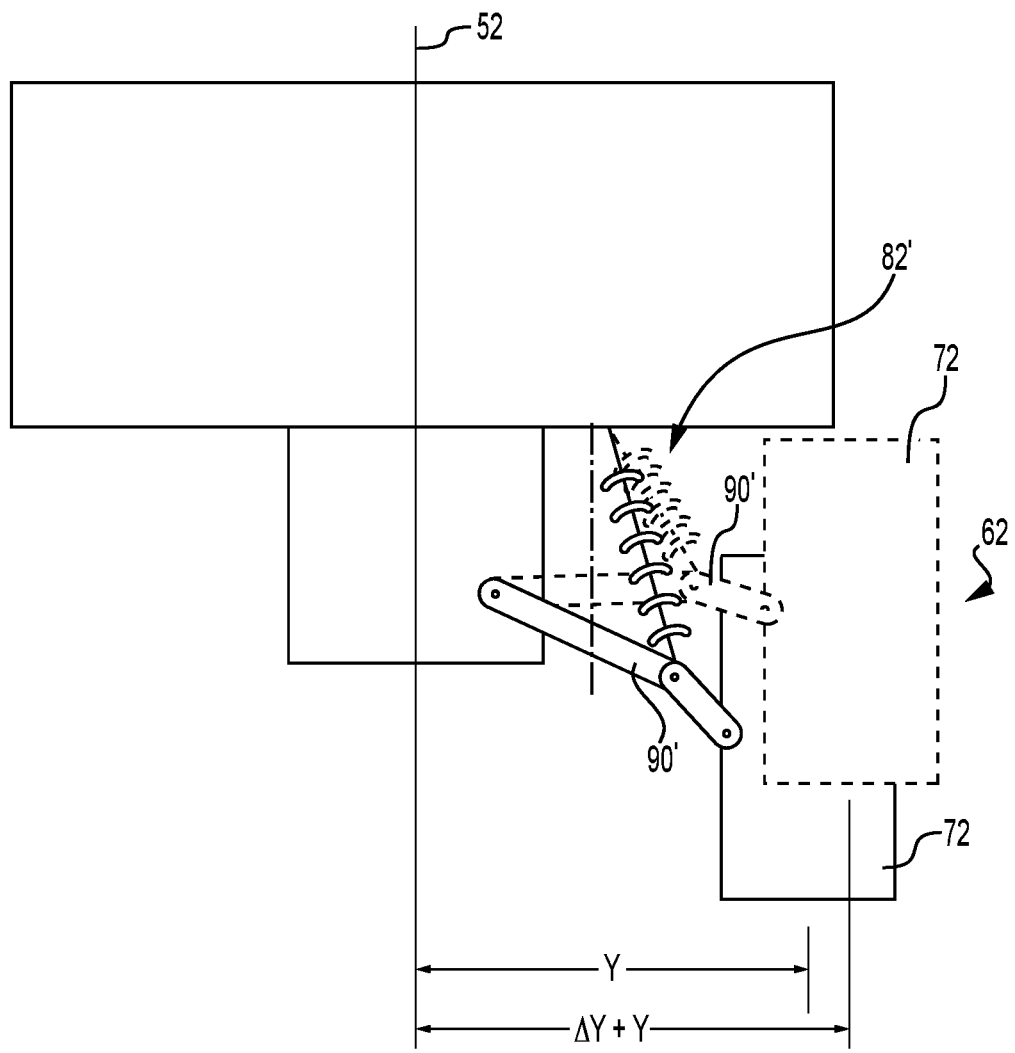
FIG. 4 is a schematic rear view of the rear right suspension system of an UTV in a compressed state (dotted lines) and in a rest state (solid line), the rear right suspension system being a multi-link suspension system.

Referring to FIG. 4, another type of suspension system 82' connecting the intermediate axle 62 to the vehicle 50 is shown. The suspension system 82' is a multi-link suspension system that includes linkages 90' that are shown schematically and a shock absorber assembly 92'. The linkages 90' control the movement of the intermediate rear wheel 72 as the suspension system 82' compresses such that the camber angle of the intermediate rear wheel 72 remains unchanged. However, the suspension system 82' causes the intermediate rear wheel 72 to move laterally outwardly away from the longitudinal center plane 52 of the vehicle 50 when the suspension system 82' compresses. For example, when the suspension system 82' is in rest state (shown in solid lines in FIG. 4), the lateral distance between the longitudinal center plane 52 and the lateral center of the wheel 72 is Y, and when the suspension system 82' is compressed (shown in dotted lines in FIG. 4), the lateral distance between the longitudinal center plane 52 and the lateral center of the wheel 72 increase by an increment $\Delta Y$, and therefore the lateral distance become $Y+\Delta Y$. However, should a typical track system be connected to the vehicle 50 in replacement of the wheel 72, the lateral movement caused by the suspension system 82' can affect significantly the traction of the endless track in certain circumstances and increase the risks of the endless track coming off the idler and support wheel assemblies of the track system.

The above described drawbacks of typical suspension systems found on UTVs (such as the suspension systems 82, 82') have led to the development of the present technology, which is a track system 100 that is suitable for installation to the intermediate axle 62 and the rear axle 64 of the vehicle 50 and that allows the suspension systems 82, 84 of the vehicle 50 to function independently.

Figure 5:
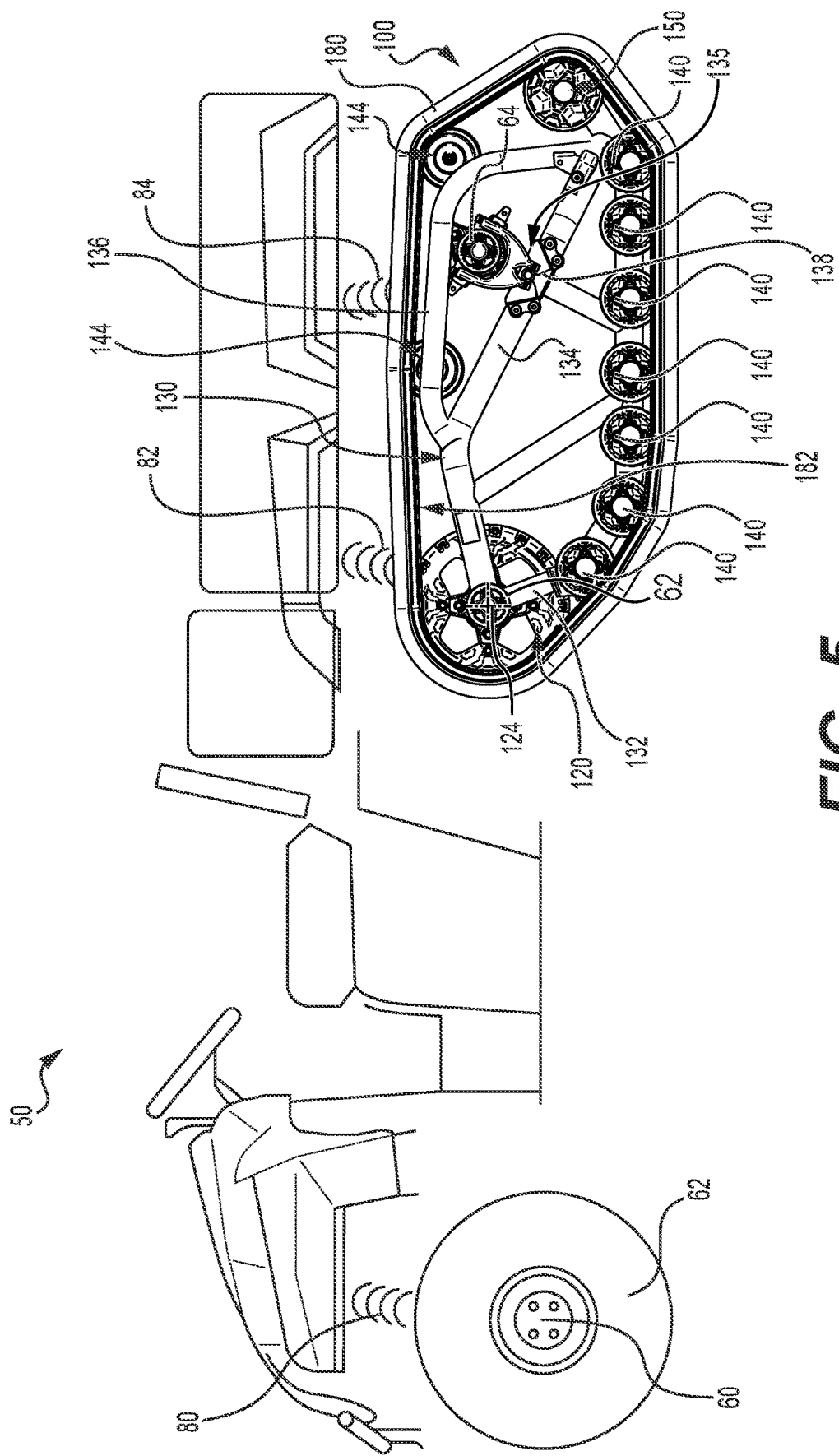
FIG. 5 is a schematic, left side elevation view of an UTV with a track system in accordance with one embodiment of the present technology.

Referring to FIG. 5, the vehicle 50 has been retrofitted to replace the left and right intermediate and rear wheels 72, 74 with left and right track systems 100 (only the left track system 100 is shown). The track system 100 has a longitudinal center plane 102 (FIG. 6) that extends through a lateral center of the track system 50.

Figure 6:
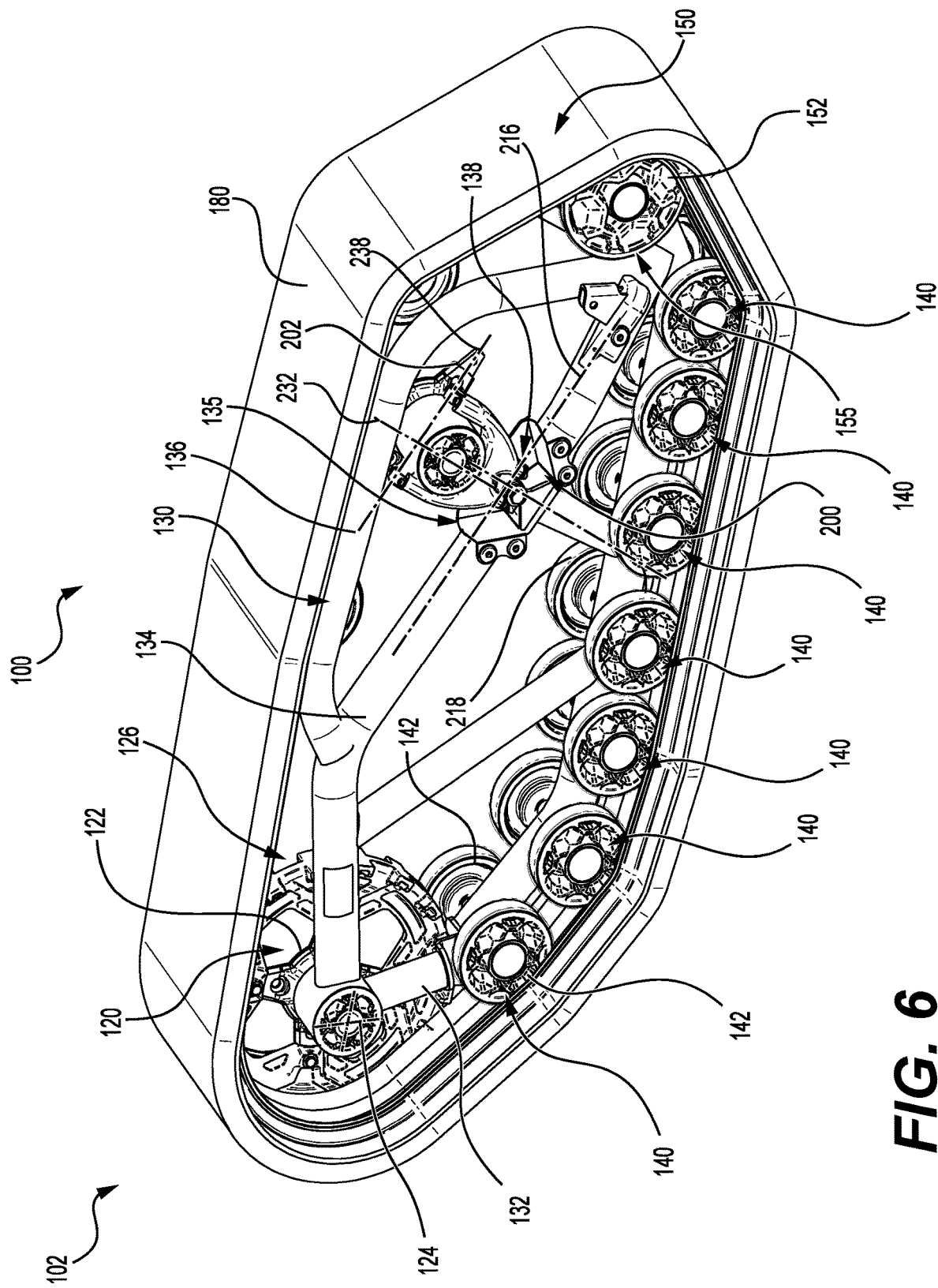
FIG. 6 is a perspective view taken from a top, rear, left side of the track system of FIG. 5.

Referring to FIGS. 5 and 6, the track system 100 includes a sprocket wheel assembly 120 which is operatively connected to the intermediate axle 62 by a hub mount 122. More specifically, the hub mount 122 is connected to the intermediate axle 62 such that when the intermediate axle 62 rotates, the hub mount 122 also rotates, which in turn rotates the sprocket wheel assembly 120, thereby driving an endless track 180 of the track system 100. It is contemplated that in some embodiments, the sprocket wheel assembly 120 could be connected to the intermediate axle 62 differently. The sprocket wheel assembly 120 rotates about a sprocket axis 124 (shown as a "+" sign in FIG. 6). The sprocket axis 124 is generally perpendicular to the longitudinal center plane 102. The sprocket wheel assembly 120 defines two sets of laterally spaced recesses 126 that are spaced on the circumference of the sprocket wheel assembly 120. The two sets of laterally spaced recesses 126 are adapted, as will be described in greater detail below, to receive left and right sets of laterally spaced lugs (not shown) provided on an inner surface 182 of the endless track 180.

The track system 100 also includes a frame 130 that extends along the longitudinal center plane 102. The frame 130 is positioned laterally outwardly from the sprocket wheel assembly 120. The frame 130 has a lower member 132, an intermediate member 134 and an upper member 136. The lower member 132 and the intermediate member 134 are jointly connected around the sprocket wheel assembly 120, and the lower member 132 extends downwardly therefrom. The upper member 136 extends upwardly from the intermediate member 134. The intermediate member 134 defines a recess 135 in a central region thereof. The intermediate member 134 has a connecting portion 138 disposed in the recess 135. It is contemplated that in some embodiments, the frame 130 could be configured otherwise. For instance, the number of members could be different and/or the connecting portion 138 could be disposed elsewhere along the frame 130.

The track system 100 also has seven support wheel assemblies 140 that are rotationally connected to the lower member 132 of the frame 130. It is contemplated that in some embodiments, there could be more or less than seven support wheel assemblies 140. Each of the support wheel assemblies 140 has two laterally spaced wheels 142 structured for engaging the inner surface 182 of the endless track 180. The track system also has two support wheel assemblies 144 that are rotationally connected to the upper member 136 of the frame 130 (only the inner support wheels 142 are shown in FIG. 5).

The track system 100 also has an idler wheel assembly 150 that is rotationally connected to the lower member 132 of the frame 10 by a tension adjustment system 155 (FIG. 6). The tension adjustment system 155 allows fore and aft movement of the idler wheel assembly 150 relative to the frame 130, permitting adjustment of the tension in the endless track 180. The idler wheel assembly 150 has two laterally spaced wheels 152 also structured for engaging the inner surface of the endless track 180.

The track system 100 also has a pivoting assembly 200 which is pivotally connected to the frame 130, and operatively connected to the rear axle 64 by a hub mount 202. The pivoting assembly 200 will be described in greater detail below.

The track system 100 also has the endless track 180. The endless track 180 is wrapped around the frame 130, the sprocket wheel assembly 122, the support wheels assemblies 140, 144 and the idler wheel assembly 150. The endless track 180 has the inner surface 182 and an outer, ground-engaging surface 184. The inner surface 182 of the endless track 180 has the left and right sets of laterally spaced of lugs. The left and right set of lugs are adapted to be received within the recesses 126 of the sprocket wheel assembly 120. It is contemplated that in some embodiments, there could be only one set of lugs. The endless track 180 is an endless polymeric track. It is contemplated that in other embodiments, the endless track 180 could be constructed of a wide variety of materials and structures including metallic components.

First Embodiment of the Pivoting Assembly

Figure 7A:
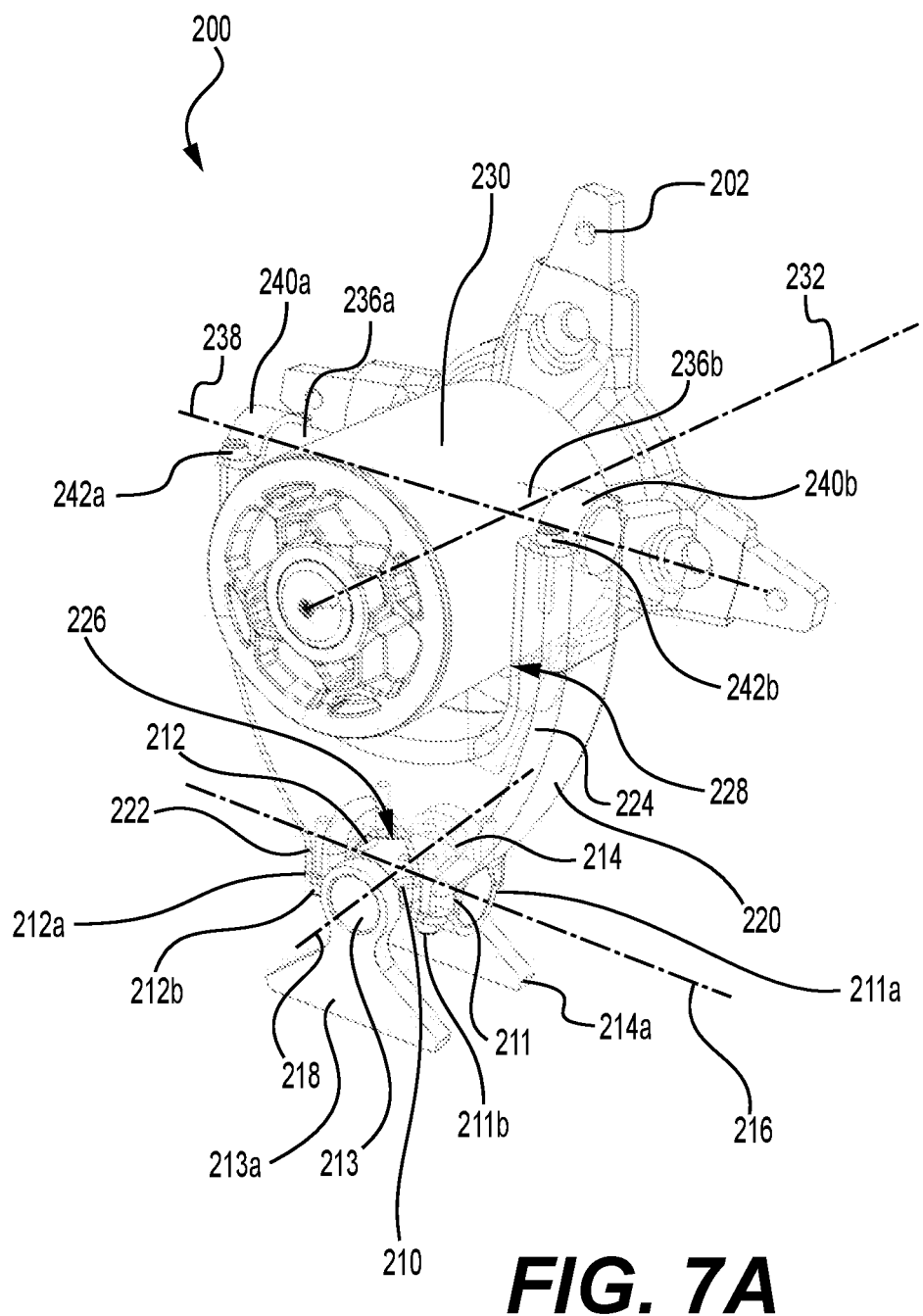
FIG. 7A is a perspective view taken from a top, rear, left side of a first embodiment of a pivoting assembly of the track system of FIG. 5, with a pivoting member being shown in transparency.
Figure 7B:
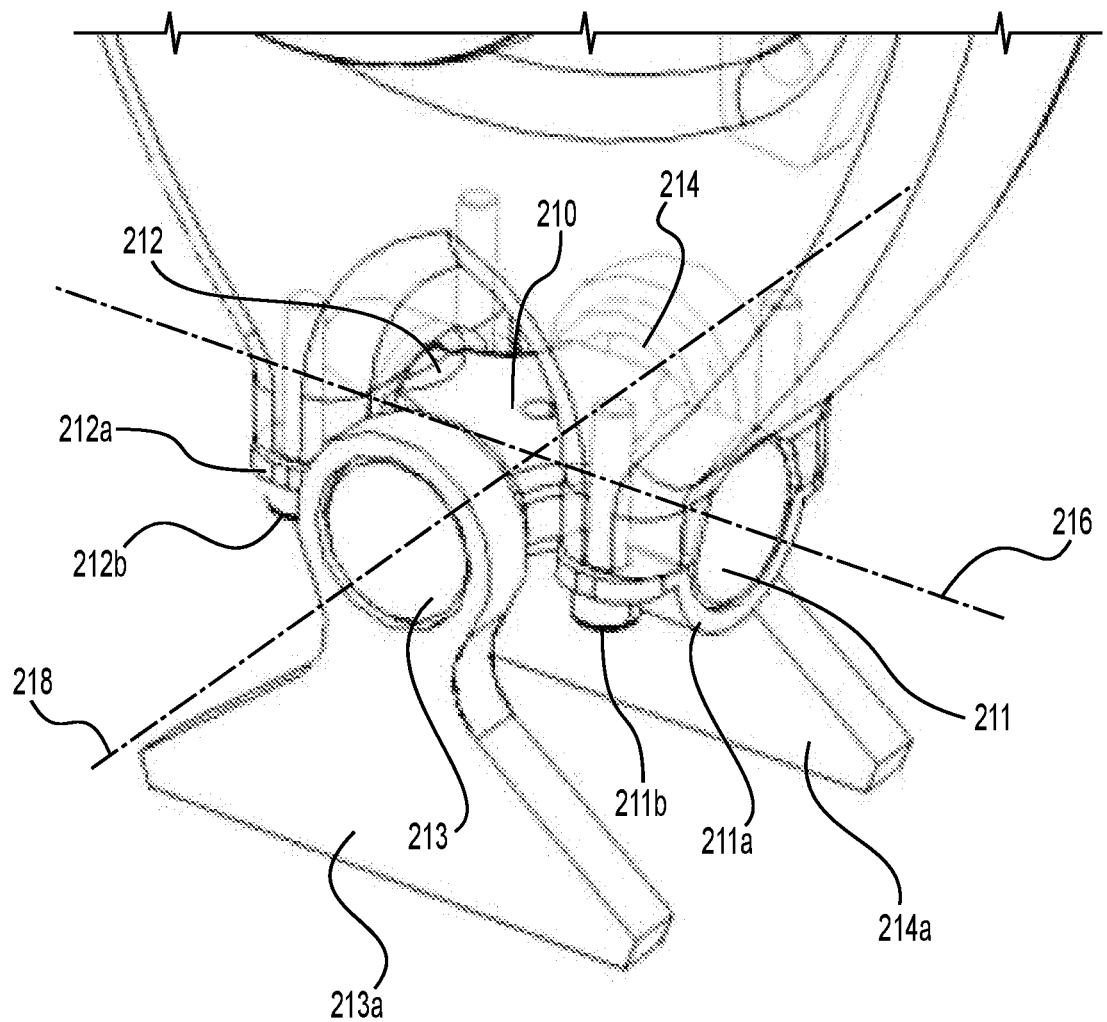
FIG. 7B is a close-up perspective view taken from a top, rear, left side of a bottom portion of the pivoting assembly of FIG. 7A, with the pivoting member being shown in transparency.

Referring to FIGS. 7A and 7B, a first embodiment of the pivoting assembly 200 will now be described. In the present embodiment, the pivoting assembly 200 has a pivot member 210, a pivotable member 220 and a casing 230. The pivot member 210 has four members 211, 212, 213, 214 where the members 211, 212 are longitudinally aligned and the members 213, 214 are laterally aligned. Thus, the pivot member 210 has a cruciform shape. The pivot member 210 defines a longitudinally extending pivot axis 216 that extends through the members 211, 212. The pivot member 210 also defines a laterally extending pivot axis 218 that extends through the members 213, 214. The members 213, 214 are pivotally connected to the connecting portion 138 of the frame 130 via tabs 213a, 214a, and the members 213, 214 are pivotally connected to the pivotable member 220 via the members 211, 212.

The pivotable member 220 has a lower portion 222 and an upper portion 224. The lower portion 222 is received in the recess 135 of the intermediate member 134. The lower portion 222 defines a lower recess 226 adapted to receive a portion of the pivot member 210 therein. As mentioned above, the lower portion 222 is pivotally connected to the pivot member 210 via the member 211, 212. Brackets 211a, 212a are connected to the lower portion 222 of the pivotable member 220 via fasteners 211b, 212b. The brackets 211a, 212a pivotally connect the members 211, 212 to the lower portion 222 of the pivotable member 220. The upper portion 224 defines an upper recess 228. The upper portion 224 is pivotally connected to the casing 230 such that a portion of the casing 230 is received in the recess 230.

The casing 230 defines an aperture (not shown) that is adapted to receive a spindle of the hub mount 202. The casing 230 has bearings (not shown) disposed in the aperture such that the casing 230 is rotationally connected to the hub mount 202. More precisely, the bearings ensure that the hub mount 202 is free to rotate with respect to the casing 230. Thus, when the rear axle 64 turns, the hub mount 202 also turns, given that the hub mount 202 is operatively connected to the rear axle 64, but the casing 230 does not turn. The casing 230 defines a laterally extending casing axis 232 that extends above the lateral pivot axis 218. The casing 230 further has forwardly and rearwardly projecting pins 236a, 236b. The pins 236a, 236b are integrally formed with the casing 230, but could be provided as separate components connected to the casing 230 in other embodiments. The pins 236a, 236b define a longitudinally extending axis 238. Brackets 240a, 240b are connected to the upper portion 224 of the pivotable member 220 via fasteners 242a, 242b. Similar to the members 211, 212, the pins 236a, 236b of the casing 230 are pivotally connected to the upper portion 224 of the pivotable member 220 via the brackets 240a, 240b.

Referring to FIGS. 6, 7A and 7B, when the pivotable member 220 is connected to the intermediate member 134 of the frame 130, the pivotable member 220 is inclined such that the pivot axis 218 is disposed in front of the casing axis 232. Therefore, the longitudinally extending axes 216, 238 are skewed relative to the horizontal, but still extend parallel to the longitudinal center plane 102.

When the track system 100 encounters an obstacle, the pivotable member 220 is pivotable between a laterally inward position (shown in FIG. 9E) and a laterally outward position (shown in FIG. 9D) about the longitudinal pivot axis 216 so that the rear axle 64 can move to compensate for the movement of the intermediate axle 62, and so as to avoid impeding travel of the suspension systems 82, 84. In the present embodiment, the pivotable member 220 can pivot about the longitudinal pivot axis 216 within a range of motion of about 50 degrees (about 25 degrees clockwise, and about 25 degrees counter-clockwise with reference to FIGS. 9D and 9E). The pivotal movement of the pivotable member 220 about the longitudinal pivot axis 216 causes the upper portion 224 to be displaced laterally relative to the lower portion 222. In the present embodiment, the upper portion 224 can be displaced laterally by about 120 millimeters relative to the lower portion 222. In other embodiments, the upper portion 224 can be displaced laterally by more or less than 120 millimeters relative to the lower portion 222. As the casing 230 is pivotally connected to the pivotable member 220 about the axis 238, when the upper portion 224 is displaced laterally, the casing 230 is also displaced laterally.

The pivotable member 220 is also pivotable between a longitudinal forward position (shown in FIG. 8D) and a longitudinal rearward position (shown in FIG. 8E) about the laterally extending pivot axis 218. In the present embodiment, the pivotable member 220 can pivot about the laterally extending pivot axis 218 within a range of motion of about 20 degrees (about 10 degrees clockwise, and about 10 degrees counter-clockwise with reference to FIGS. 8D and 8E). The pivotal movement of the pivotable member 220 about the pivot axis 218 causes the upper portion 224 to be displaced longitudinally relative to the lower portion 222. In the present embodiment, the upper portion 224 can be longitudinally displaced by about 65 millimeters relative to the lower portion 222. In other embodiments, the upper portion 224 can be longitudinally displaced by more or less than 65 millimeters relative to the lower portion 222.

Referring now to FIGS. 8A to 9E, the track system 100 and the pivoting assembly 200 being shown in different positions will be described in greater detail.

Figure 9A:
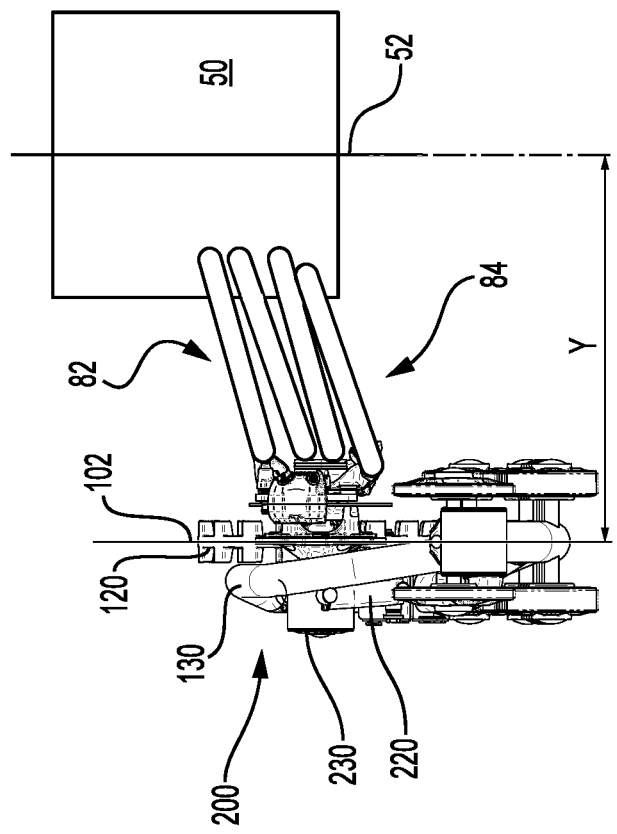
FIG. 9A is a rear view of the track system of FIG. 8A connected to a schematic view of the UTV of FIG. 5.
Figure 8A:
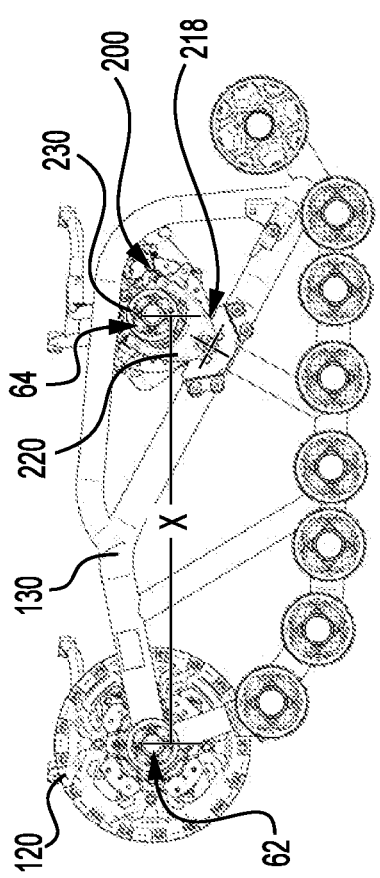
FIG. 8A is a left side elevation view of the track system of FIG. 5 in an initial position, with an endless track removed.

Referring to FIGS. 8A and 9A, the track system 100 is shown in an initial position. In the initial position, the sprocket wheel assembly 120 and the pivoting assembly 200 are in a resting position. The intermediate axle 62 and the rear axle 64 are vertically aligned, and the true distance between the intermediate axle 62 and the rear axle 64 is X, and the lateral distance between the longitudinal center plane 52 of the vehicle 50 and the longitudinal center plane 102 of the track system 100 is Y. As mentioned above, when the pivot assembly 200 is in the resting position, the pivotable member 200 is skewed at an angle with respect to the level ground. It is contemplated that the orientation of the pivotable member 200 could be different in other embodiments.

Referring to FIGS. 8B and 9B, the track system 100 is shown encountering an obstacle 105B causing the front support wheel assembly 140, the sprocket wheel assembly 120, and thereby the intermediate axle 62, to move vertically upwardly from the initial position. Thus, the true distance X changes by an increment $\Delta X_B$, and is therefore $X+\Delta X_B$. In response and as the suspension assembly 82 of the vehicle 50, connected to the intermediate axle 62 compresses and moves the intermediate axle 62 upwardly, the track system 100 moves laterally outwardly with respect to the initial position. Thus, the lateral distance Y changes by an increment $\Delta Y_B$, and is therefore $Y+\Delta Y_B$. The longitudinal center plane 102 of the track system 100 remains parallel with the longitudinal center plane 52 of the vehicle 50. The pivotable member 220 pivots about the longitudinal pivot axis 216 and the lateral pivot axis 218 such that the rear axle 64 does not move vertically from the initial position. The longitudinal center plane 102 of the track system 100 also remains parallel with the longitudinal center plane 52 of the vehicle 50 as the pivotable member 220 pivots.

Referring to FIGS. 8C and 9C, the track system 100 is shown encountering an obstacle 105C causing the sprocket wheel assembly 120 and the pivoting assembly 200 to move vertically upwardly from their initial positions. The true distance X between the intermediate and rear axles 62, 64 does not change compared to the true distance when the track system 100 is in the initial position. In response and as the suspension assemblies 82, 84 of the vehicle 50 connected to the intermediate axle 62 and the rear axle 64 compress and moves the intermediate axle 62 and the rear axles 64 upwardly, the track system 100 moves laterally outwardly with respect to the resting position. Thus, the lateral distance Y changes by an increment $\Delta Y_C$, and is therefore $Y+\Delta Y_C$. As the axles 62, 64 are vertically aligned and the true distance X does not change, the pivoting assembly 200 remains in the resting position. In this situation, the casing axis 232 remains parallel to the pivot axis 218, which reduces the stressed induced in the axle 62 by better distributing the load supported by the axle 64 along the frame 130 and to the support wheel assemblies 140.

Figure 9D:
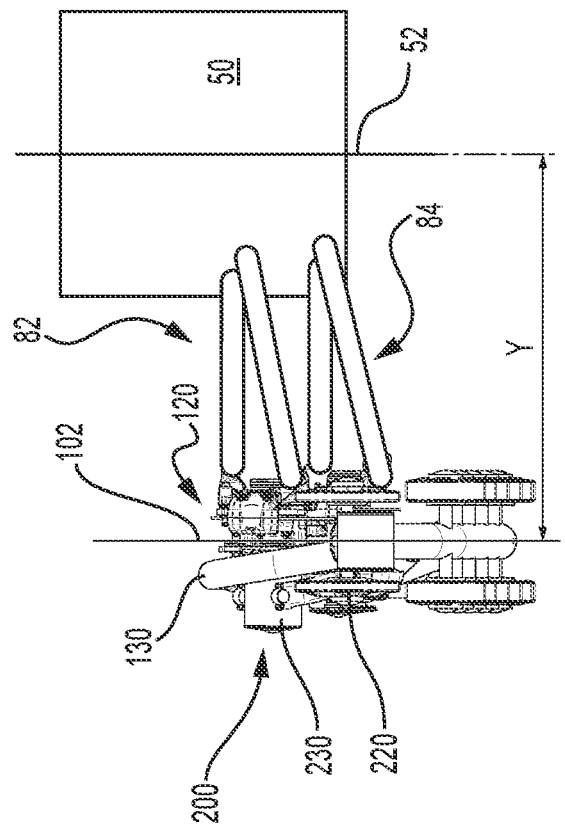
FIG. 9D is a rear view of the track system of FIG. 8D connected to a schematic view of the UTV of FIG. 5.
Figure 8D:
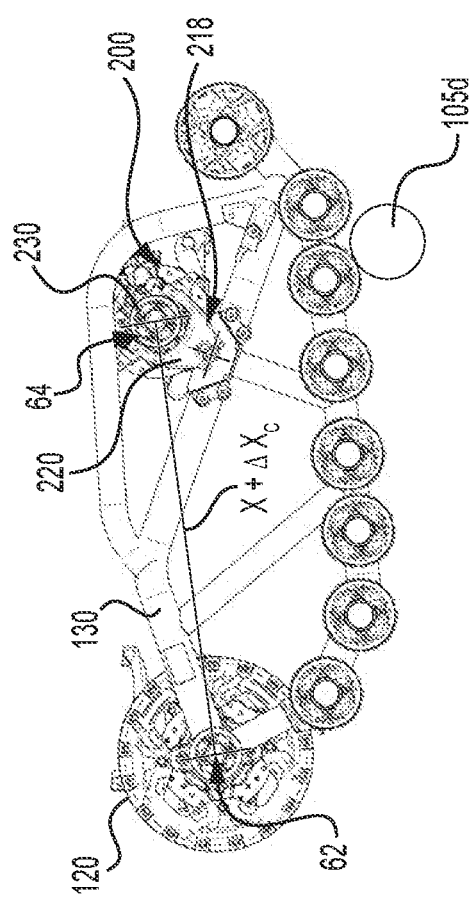
FIG. 8D is a left side elevation view of the track system of FIG. 8A encountering an obstacle causing the sprocket wheel assembly to be in the initial position, and the pivoting assembly to be in the elevated position.

Referring to FIGS. 8D and 9D, the track system 100 is shown encountering an obstacle 105D causing the rear axle 64 to move vertically upwardly from the initial position. Thus, the true distance X changes by an increment $\Delta X_E$, and therefore the true distance between the intermediate and rear axles 62, 64 becomes $X+\Delta X_C$. As the intermediate axle 62 has not moved vertically from the initial position, the track system 100 does not move laterally, and thus the lateral distance Y does not change. The pivotable member 220 pivots about the laterally extending pivot axis 218 such that the lower portion 222 moves longitudinally forward with respect to the upper portion 224 (best seen in FIG. 8D). The pivotable member 220 also pivots about the longitudinally extending pivot axis 216 such that the upper portion 224 moves laterally outwardly with respect to the lower portion 222.

Referring to FIGS. 8E and 9E, the track system 100 is shown encountering an obstacle 105E causing the rear axle 64 to move vertically downwardly from the initial position. Thus, the true distance X changes by an increment $\Delta X_E$, and therefore the true distance between the intermediate and rear axles 62, 64 becomes $X+\Delta X_E$. As the intermediate axle 62 has not moved vertically from the initial position, the track system 100 does not move laterally, and thus the lateral distance Y does not change. The pivotable member 220 pivots about the laterally extending pivot axis 218 such that the lower portion 222 moves longitudinally rearward with respect to the upper portion 224. The pivotable member 220 also pivots about the longitudinally extending pivot axis 216 such that the upper portion 224 moves laterally inwardly with respect to the lower portion 222.

It is also contemplated that in some embodiments, the suspension system 50 could be another type of suspension such as, for example suspension system 82' described above.

It is understood that if the need arises, the pivoting assembly 200 as a whole, or some of the members of the pivoting assembly 200, could be provided as replacement parts.

Second Embodiment of the Pivoting Assembly

Figure 11:
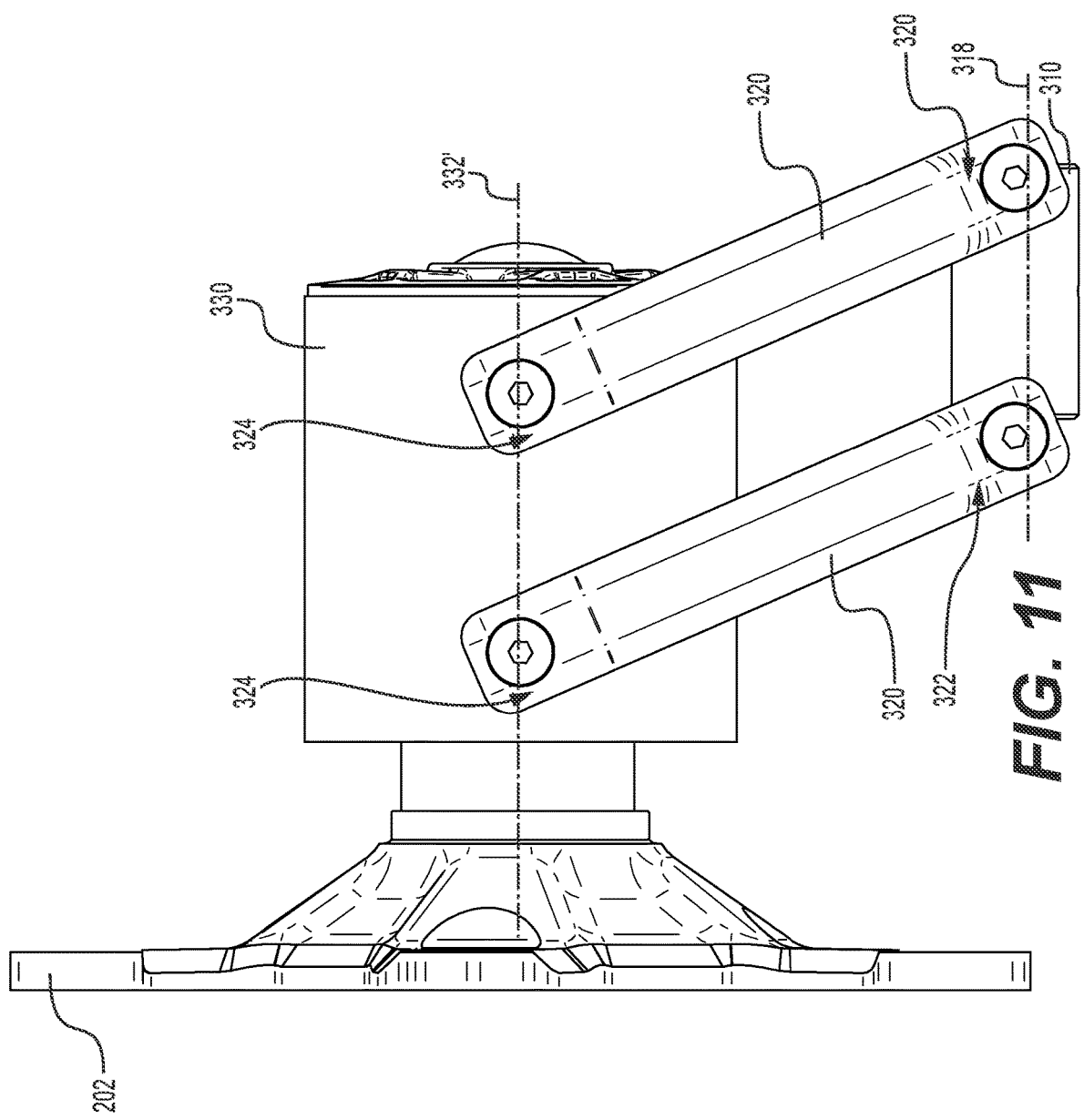
FIG. 11 is a front view of the pivoting assembly of FIG. 10 in a pivoted position.

Referring to FIGS. 10 to 11, a second embodiment of the pivoting assembly will now be described. In this embodiment, the pivoting assembly 300 has a pivot member 310, four pivotable members 320 and a casing 330.

The pivot member 310 is receivable in the recess 135 of the intermediate member 134. The pivot member 310 is pivotally connectable to the frame 130 and has a cylindrical shape. The pivot member 310 defines a laterally extending pivot axis 318 that extends laterally therethrough. The pivot member 310 is pivotally connected to the four pivotable members 320.

Each of the four pivotable members 320 has a lower portion 322 and an upper portion 324. Each of the lower portions 322 is connected to the pivot member 310, such that when the pivot member 310 rotates about the laterally extending pivot axis 318, the pivotable members 320 also pivot. Each of the upper portions 324 is connected to the casing 330, such that when the four pivotable members 320 pivot about the laterally extending pivot axis 318, the casing 330 also pivots. As per the first embodiment, by the pivotable motion, the four pivotable members 320 can move the casing 330 laterally and longitudinally relative to the pivot member 310. It is contemplated that in some embodiments, there could be only two pivotable members 320 connecting the pivot member 310 to the casing 330. Other embodiments could have more or less than three pivotable members 320 connecting the pivot member 310 to the casing 330 without departing from the present technology.

The casing 330 defines an aperture 332 that is adapted to receive the spindle of the hub mount 202. The casing 330 has bearings (not shown) disposed in the aperture 332 such that the casing 330 is rotationally connected to the hub mount 202. More precisely, the bearings ensure that the hub mount 202 is free to rotate with respect to the casing 230. Thus, when the rear axle 64 turns, the hub mount 202 also turns, given that the hub mount 202 is operatively connected to the rear axle 64, but the casing 330 does not turn. The casing 330 defines a laterally extending casing axis 332' that extends above the laterally extending pivot axis 318.

As shown in FIG. 11, the pivoting assembly 300 works similarly to the pivoting assembly 200, and thus the pivoting assembly 300 in action will not be re-described in detail. A difference with the pivoting assembly 300 from the pivoting assembly 200 is that the laterally extending pivot axis 318 remains parallel to the casing axis 332' when the pivot member 310 moves laterally relative to the casing 330. This is due to the four pivotable members 320 acting as two pairs of linkages keeping the pivot member 310 parallel to the casing 330. This feature allows for a transfer of the load supported by the rear axle 64 toward the fame 130, and ultimately to the support wheel assemblies 140 and the endless track 180, that is more even across the width of the endless track 180. Furthermore, this feature assists in reducing the stress induced in the intermediate axle 62 when the rear axle 64 moves like in situations shown in FIGS. 8B, 8D and 8E because the rear portion of the frame 130 remains closer to the longitudinal center plane 102 in certain circumstances, such as when the track system 100 travels over laterally inclined terrain.

It is understood that if the need arises, the pivoting assembly 300 as a whole, or some of the members of the pivoting assembly 300, could be provided as replacement parts.

Third Embodiment of the Pivoting Assembly

Figure 12:
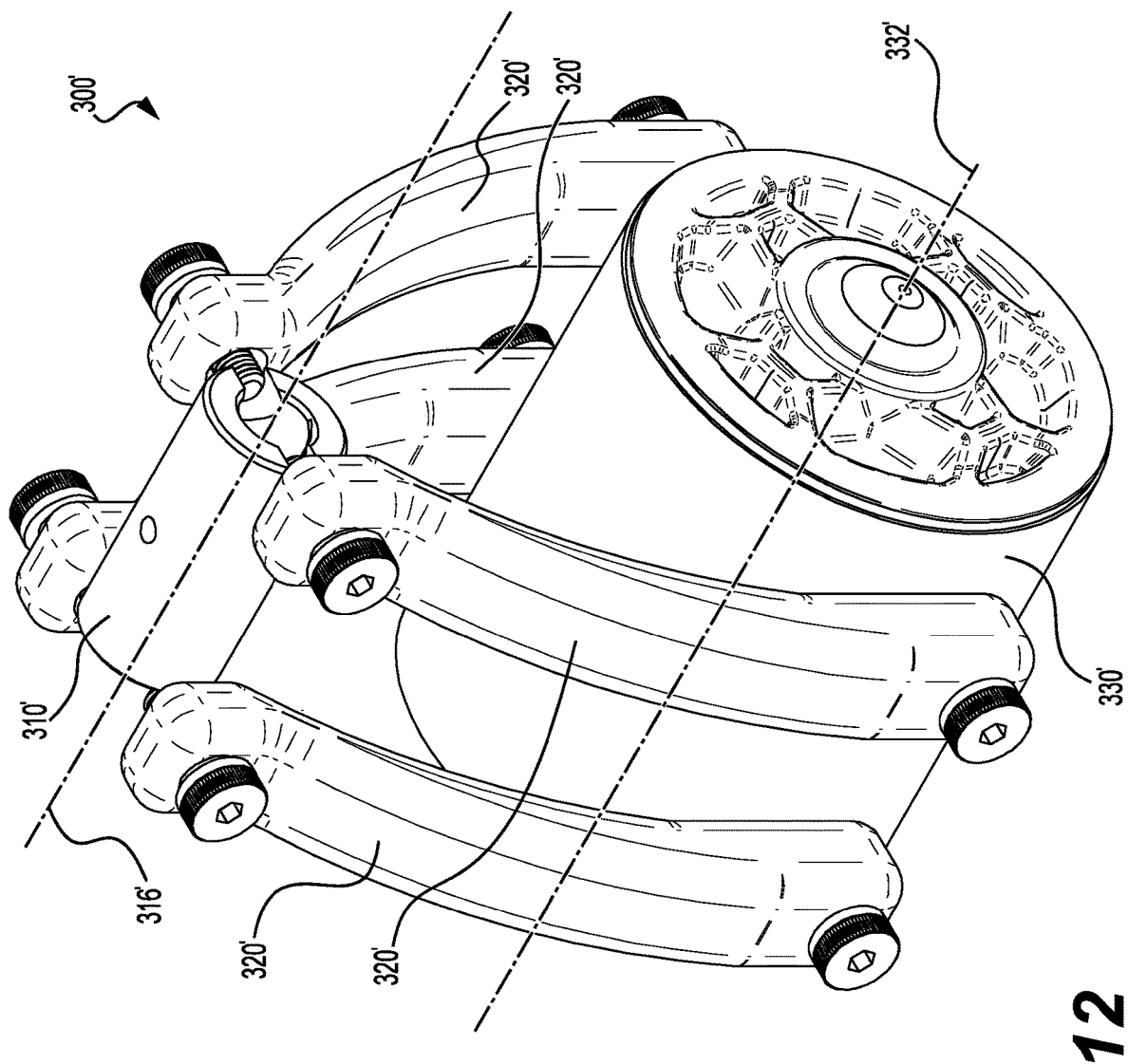
FIG. 12 is a perspective view taken from a top, front, left side of a third embodiment of a pivoting assembly of the track system of FIG. 5.

In an alternate embodiment of the pivoting assembly, the pivoting assembly 300' (shown in FIG. 12) also has the pivot member 310', the four pivotable members 320' and the casing 330'.

In the pivoting assembly 300', the frame 130' of the track system 100 is configured such that the four pivotable members 320' extend upwardly from the casing 320' so that the pivot member 310' is disposed above the casing 330'. Thus, the casing axis 332' extends below the laterally extending pivot axis 316'.

Similar to the pivoting assemblies 200, 300, it is understood that if the need arises, the pivoting assembly 300' as a whole, or some of the members of the pivoting assembly 300', could be provided as replacement parts.

Fourth Embodiment of the Pivoting Assembly

Figure 13:
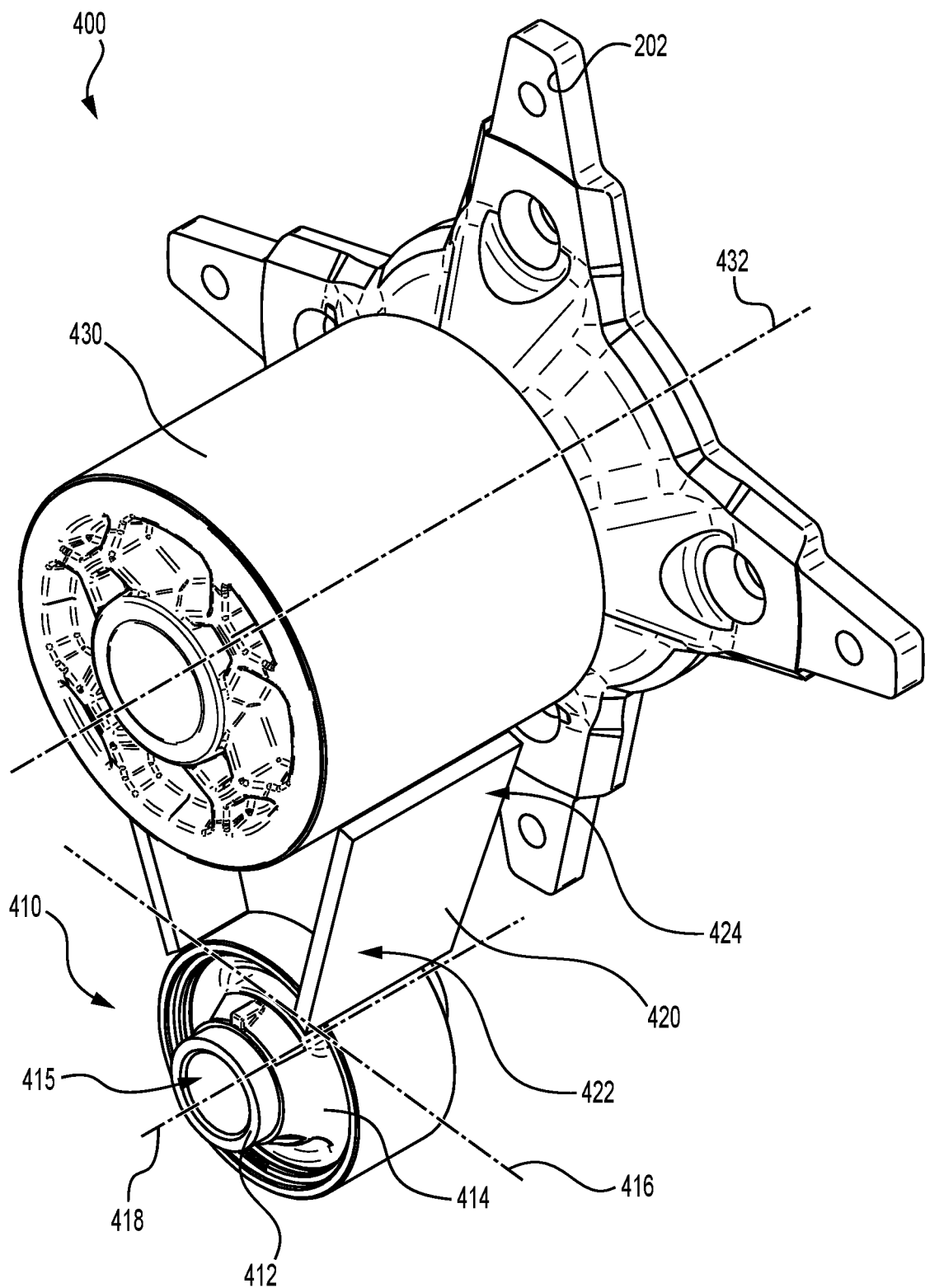
FIG. 13 is a perspective view taken from a top, rear, left side of a fourth embodiment of a pivoting assembly of the track system of FIG. 5.

Referring now to FIG. 13, a fourth embodiment of the pivoting assembly, will now be described. In this embodiment, the pivoting assembly 400 has a resilient assembly 410, a pivotable member 420 and a casing 430.

The resilient assembly 410 has a frame connecting portion 412 and a resilient member 414 connected thereto. The frame connecting portion 412 connects to the connecting portion 138 of the frame 130. It is contemplated that in some embodiments the frame connecting portion 412 could be omitted, such that the resilient member 414 directly connects to the connecting portion 138 of the frame 130. The resilient member 414 defines an aperture 415 adapted for the receiving the frame connecting portion 412 therein. The resilient member 414 defines a longitudinally extending pivot axis 416 that extends longitudinally therethrough. The resilient member 414 also defines a laterally extending pivot axis 418 that extends from a center therethrough. As will be described below, the resilient member 414 is resiliently deformable.

The pivotable member 420 has a lower portion 422 and an upper portion 424. The lower portion 422 is fixedly connected to the resilient member 414, and the upper portion 424 is connected to the casing 430. The pivotable member 420 is pivotable relative to the frame 130 about the longitudinally pivot axis 416 and about the longitudinal pivot axis 418 upon resilient deformation of the resilient member 414. In the present embodiment, the resilient member 414 being deformable allows the pivotal movement of the pivotable member 420.

The casing 430 defines an aperture (not shown) that is adapted to receive the spindle of the hub mount 202. The casing 430 has bearings (not shown) disposed in the aperture such that the casing 430 is rotationally connected to the hub mount 202. More precisely, the bearings ensure that the hub mount 202 is free to rotate with respect to the casing 430. Thus, when the rear axle 64 turns, the hub mount 202 also turns, given that the hub mount 202 is operatively connected to the axle 64, but the casing 430 does not turn. The casing 430 defines a laterally extending casing axis 432 that extends above the laterally extending pivot axis 418.

The pivoting assembly 400 works similarly to the pivoting assembly 200, and thus the pivoting assembly 400 in operation will not be re-described in detail.

It is contemplated that the resilient member 414 could be replaced by a spherical bushing, or universal joint structured for connecting the pivoting assembly 400 to the connecting portion 138 of the frame 130.

A detail worth mentioning regarding the present embodiment is that the pivoting assembly 400 requires fewer parts than the pivoting assemblies 200, 300, 300'. Thus, maintenance of the pivoting assembly 400 is facilitated when compared to maintenance of the pivoting assemblies 200, 300, 300', as there are fewer moving parts in the present embodiment than there are in the pivoting assemblies 200, 300, 300'. Durability is also expected to be improved compared to the pivoting assemblies 200, 300, 300', at least in some circumstances.

Similar to the pivoting assemblies 200, 300, 300', it is understood that if the need arises, the pivoting assembly 400 as a whole, or some of the members of the pivoting assembly 400, could be provided as replacement parts.

Modifications and improvements to the above-described embodiments of the present technology may become apparent to those skilled in the art. The foregoing description is intended to be exemplary rather than limiting. The scope of the present technology is therefore intended to be limited solely by the appended claims.

What is claimed is:

1. A track system for a vehicle having at least three axles, the track system comprising:
    a frame;
    a sprocket wheel assembly being operatively connectable to a first axle of the at least three axles, a sprocket wheel being rotationally connectable to the frame;
    an idler wheel assembly being rotationally connectable to the frame;
    a plurality of support wheel assemblies being rotationally connectable to the frame;
    a pivoting assembly having:
        a casing operatively connectable to a second axle of the at least three axles,
        at least one pivotable member having a first portion being pivotally connected to the casing, and a second portion being pivotally connected to the frame, the at least one pivotable member being pivotable between a first position and a second position about a longitudinally extending pivot axis causing the first portion to be displaced laterally relative to the second portion in response to the at least one pivotable member pivoting between the first position and the second position, and the at least one pivotable member being further pivotable between a third position and a fourth position about a laterally extending pivot axis causing the first portion to be displaced longitudinally relative to the second portion in response to the at least one pivotable member pivoting between the third position and the fourth position,
        wherein the casing defines a laterally extending casing axis, the casing axis remaining parallel to the laterally extending pivot axis in response to the at least one pivotable member pivoting from the first position to the second position; and
    an endless track wrapped around the sprocket wheel assembly, the idler wheel assembly and the plurality of support wheel assemblies.

2. The track system of claim 1, further comprising:
    a first hub mount operable connectable to the first axle of the at least three axles and to the sprocket wheel assembly; and
    a second hub mount operatively connectable to the second axle of the at least three axles, the second hub mount being rotationally connectable to the casing.

3. The track system of claim 1, wherein the first portion of the at least one pivotable member is displaceable laterally outwardly relative to the second portion in response to the at least one pivotable member pivoting from the first position to the second position.

4. The track system of claim 1, wherein the first portion of the at least one pivotable member is displaceable laterally inwardly relative to the second portion in response to the at least one pivotable member pivoting from the second position to the first position.

5. The track system of claim 1, wherein a longitudinal center plane of the track system remains parallel with a longitudinal center plane of the vehicle in response to the pivotable member pivoting from the first position to the second position.

6. The track system of claim 5, wherein in response to the first axle moving vertically, the track system moves laterally.

7. The track system of claim 1, wherein the at least one pivotable member includes two pivotable members.

8. The track system of claim 1, wherein the at least one pivotable member includes four pivotable members.

9. The track system of claim 8, wherein two of the four pivotable members are connected in a first pair, and another two of the four pivotable members are connected in a second pair.

10. The track system of claim 1, wherein the casing axis remains parallel to the laterally extending pivot axis in response to the at least one pivotable member pivoting from the third position to the fourth position.

11. The track system of claim 1, wherein the casing axis extends above the laterally extending pivot axis.

12. The track system of claim 1, wherein the second portion of the at least one pivotable member is connected to the frame by a resilient assembly, the resilient assembly being deformable such that the at least one pivotable member is pivotable relative to the frame.

13. A vehicle comprising:
    at least three axles;
    at least three suspension assemblies, wherein:
        a first axle of the at least three axles is operatively connected to a first suspension assembly of the at least three suspension assemblies; and
        a second axle of the at least three axles is operatively connected to a second suspension assembly of the at least three suspension assemblies;
    at least one track system of claim 1 connected to the first and second axles.

14. The vehicle of claim 13, wherein the first suspension assembly is operatively connected to the first axle independently of the second suspension assembly, and the second suspension assembly is operatively connected to the second axle independently of the first suspension assembly.

15. The vehicle of claim 13, wherein the first axle is an intermediate axle, and the second axle is a rear axle of the vehicle.

16. A pivoting assembly adapted for connection between a frame of a track system and an axle of a vehicle, the pivoting assembly comprising:
    a casing operatively connectable to the axle of the vehicle, and
    at least one pivotable member having a first portion being pivotally connected to the casing, and a second portion being pivotally connected to the frame of the track system, the at least one pivotable member being pivotable between a first position and a second position about a longitudinally extending pivot axis causing the first portion to be displaced laterally relative to the second portion in response to the at least one pivotable member pivoting between the first position and the second position, and
    the at least one pivotable member being further pivotable between a third position and a fourth position about a laterally extending pivot axis causing the first portion to be displaced longitudinally relative to the second portion in response to the at least one pivotable member pivoting between the third position and the fourth position,
    wherein the casing defines a laterally extending casing axis, the casing axis remaining parallel to the laterally extending pivot axis in response to the at least one pivotable member pivoting from the first position to the second position.

17. The pivoting assembly of claim 16, wherein the first portion of the at least one pivotable member is displaceable laterally outwardly relative to the second portion in response to the at least one pivotable member pivoting from the first position to the second position.

18. A pivoting assembly adapted for connection between a frame of a track system and an axle of a vehicle, the pivoting assembly comprising:
a casing operatively connectable to the axle of the vehicle,
at least one pivotable member having a first portion and a second portion, the first portion being connectable to the casing, and
a resilient assembly connectable to the second portion of the at least one pivotable member, and the second portion of the at least one pivotable member being connectable to the frame through the resilient assembly;
the at least one pivotable member being pivotable between a first position and a second position about a longitudinally extending pivot axis causing the first portion of the at least one pivotable member to be displaced laterally relative to the second portion of the at least one pivotable member in response to the resilient assembly resiliently deforming between the first position and the second position, and
the at least one pivotable member being further pivotable between a third position and a fourth position about a laterally extending pivot axis causing the first portion of the at least one pivotable member to be displaced longitudinally relative to the second portion of the at least one pivotable member in response to the resilient assembly resiliently deforming between the third position and the fourth position,
wherein the casing defines a laterally extending casing axis, the casing axis remaining parallel to the laterally extending pivot axis in response to the at least one pivotable member pivoting from the first position to the second position.

19. The pivoting assembly of claim 18, wherein the first portion of the at least one pivotable member is displaceable laterally outwardly relative to the second portion in response to the at least one pivotable member pivoting from the first position to the second position.

* * * * *